July 21, 1942.   L. E. POOLE ET AL   2,290,381
ARMATURE ASSEMBLING MACHINE
Filed Nov. 20, 1940   22 Sheets-Sheet 3
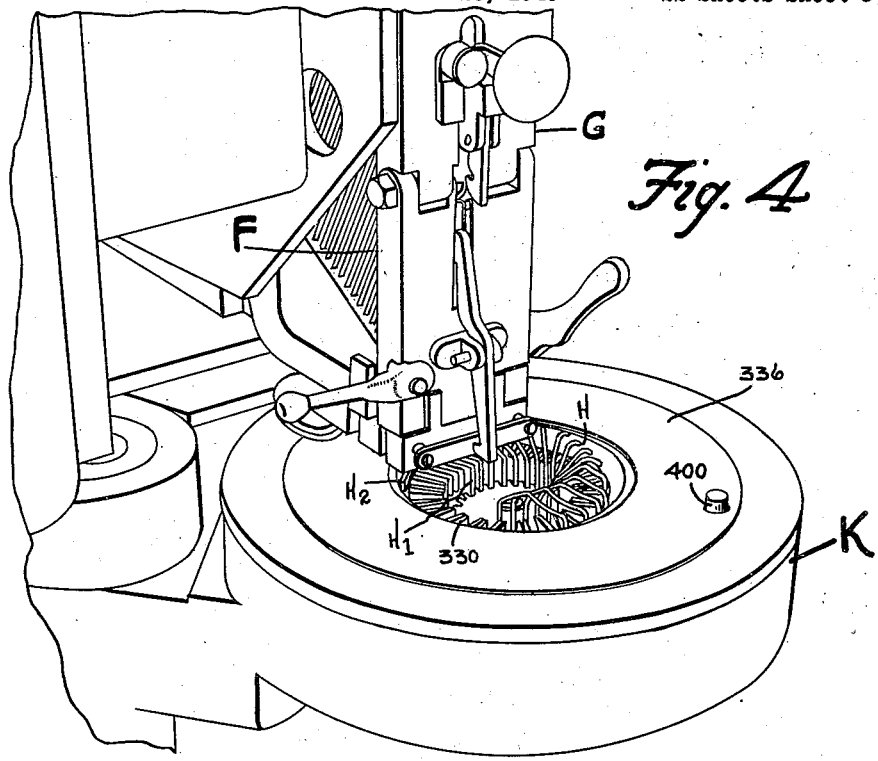
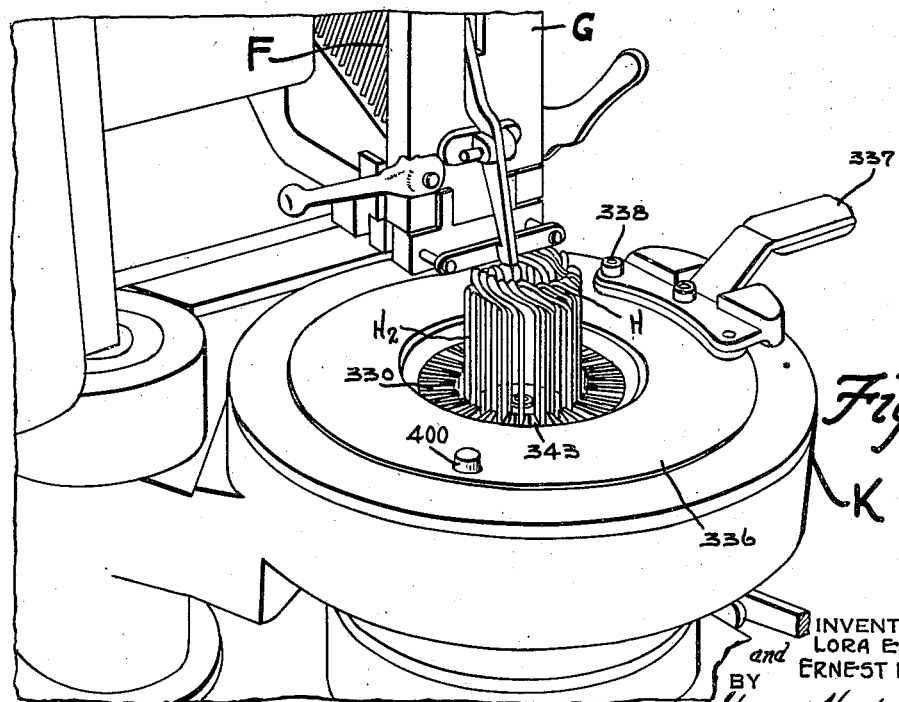
INVENTORS
LORA E. POOLE
and ERNEST R. FAUSSET
BY
Spencer Hardman & Fehr
their ATTORNEYS

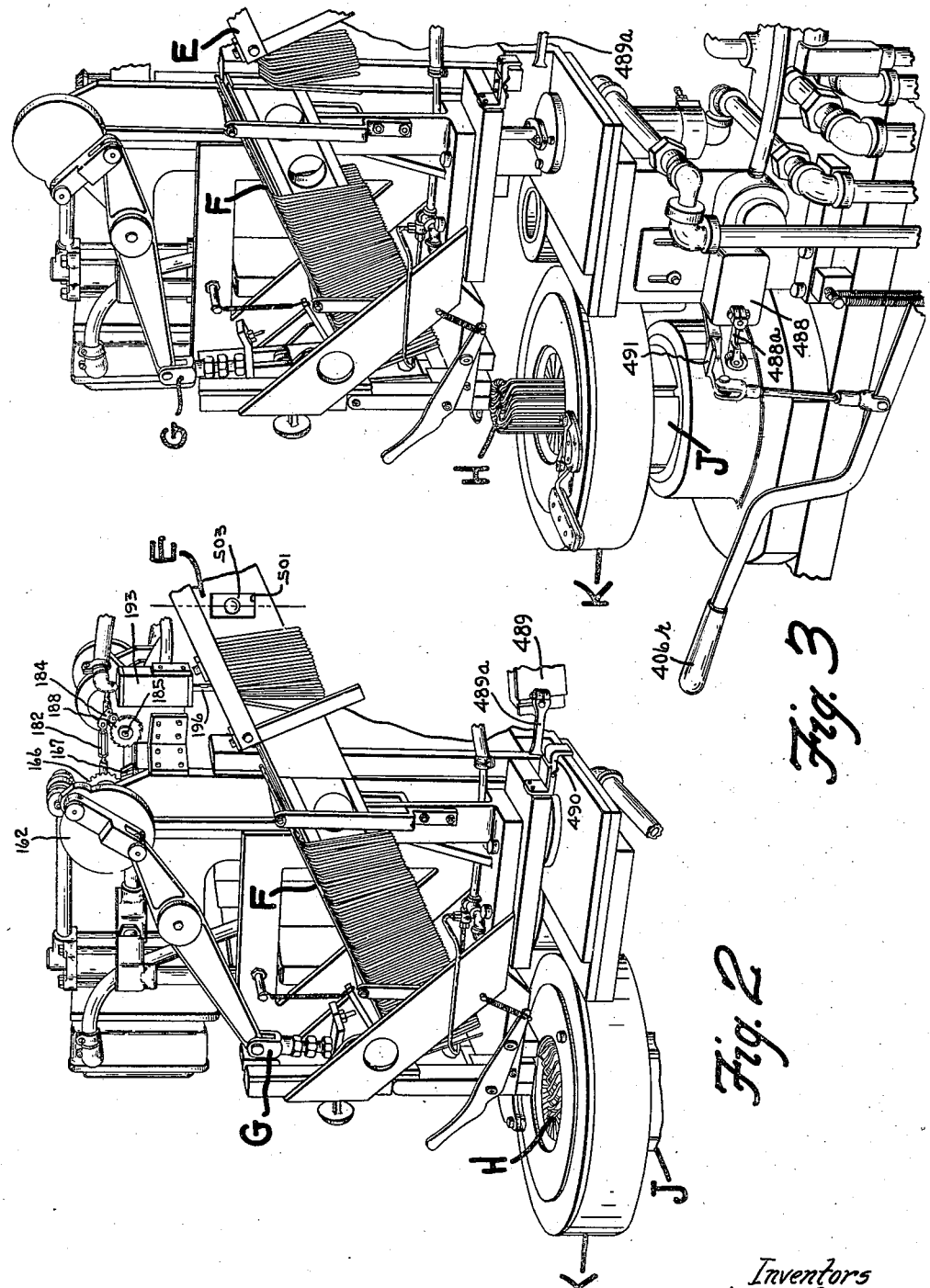

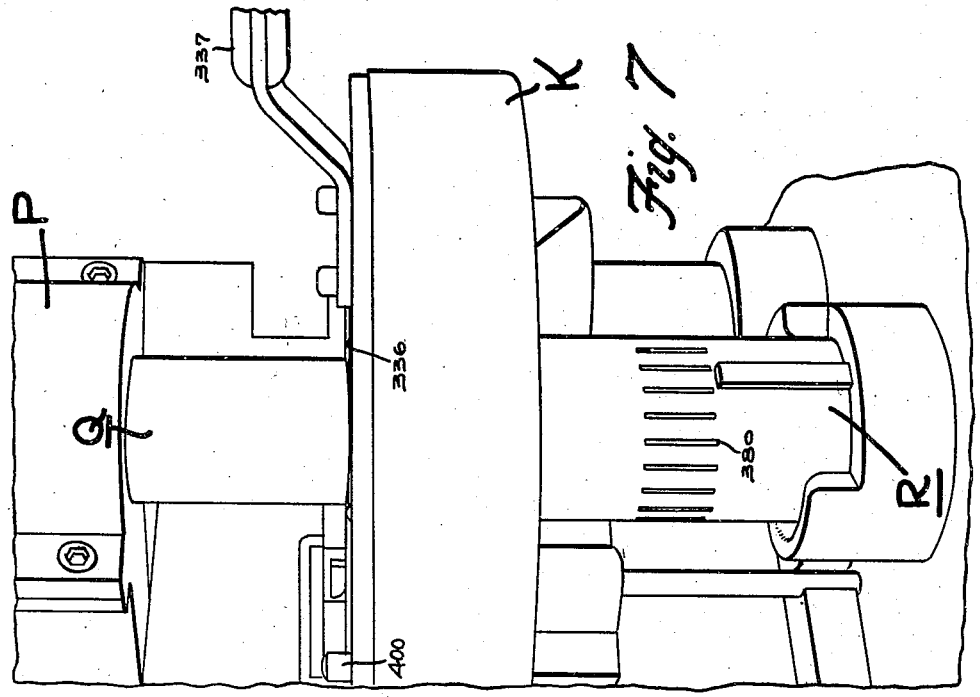
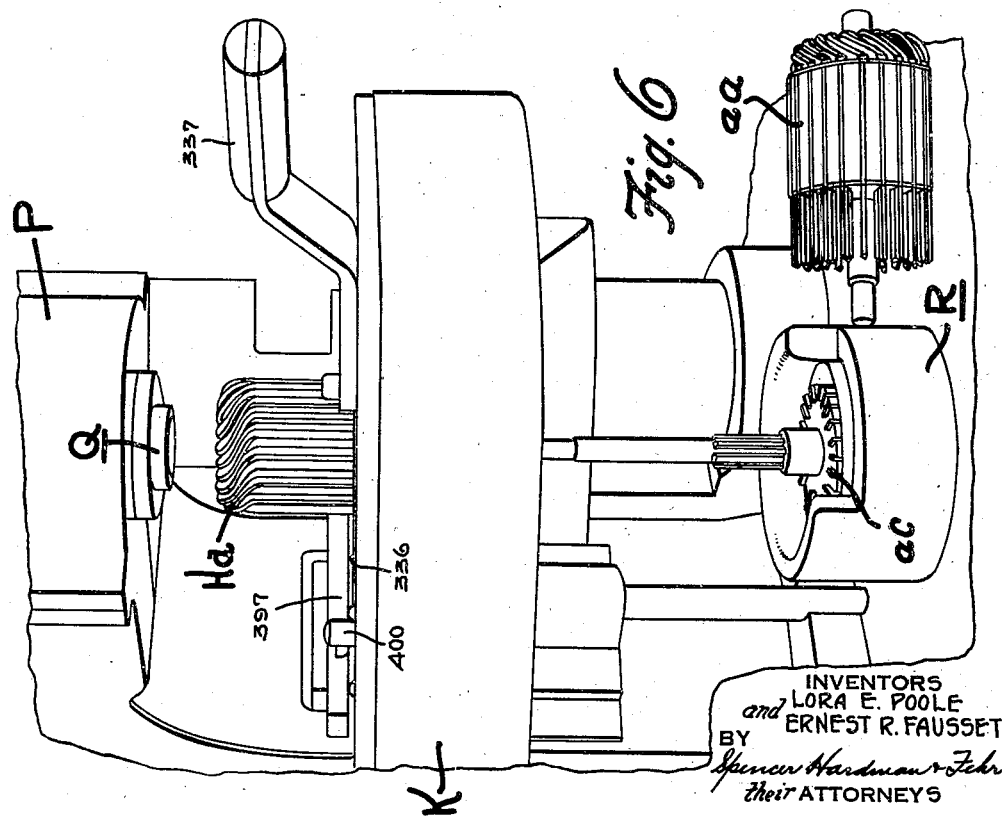

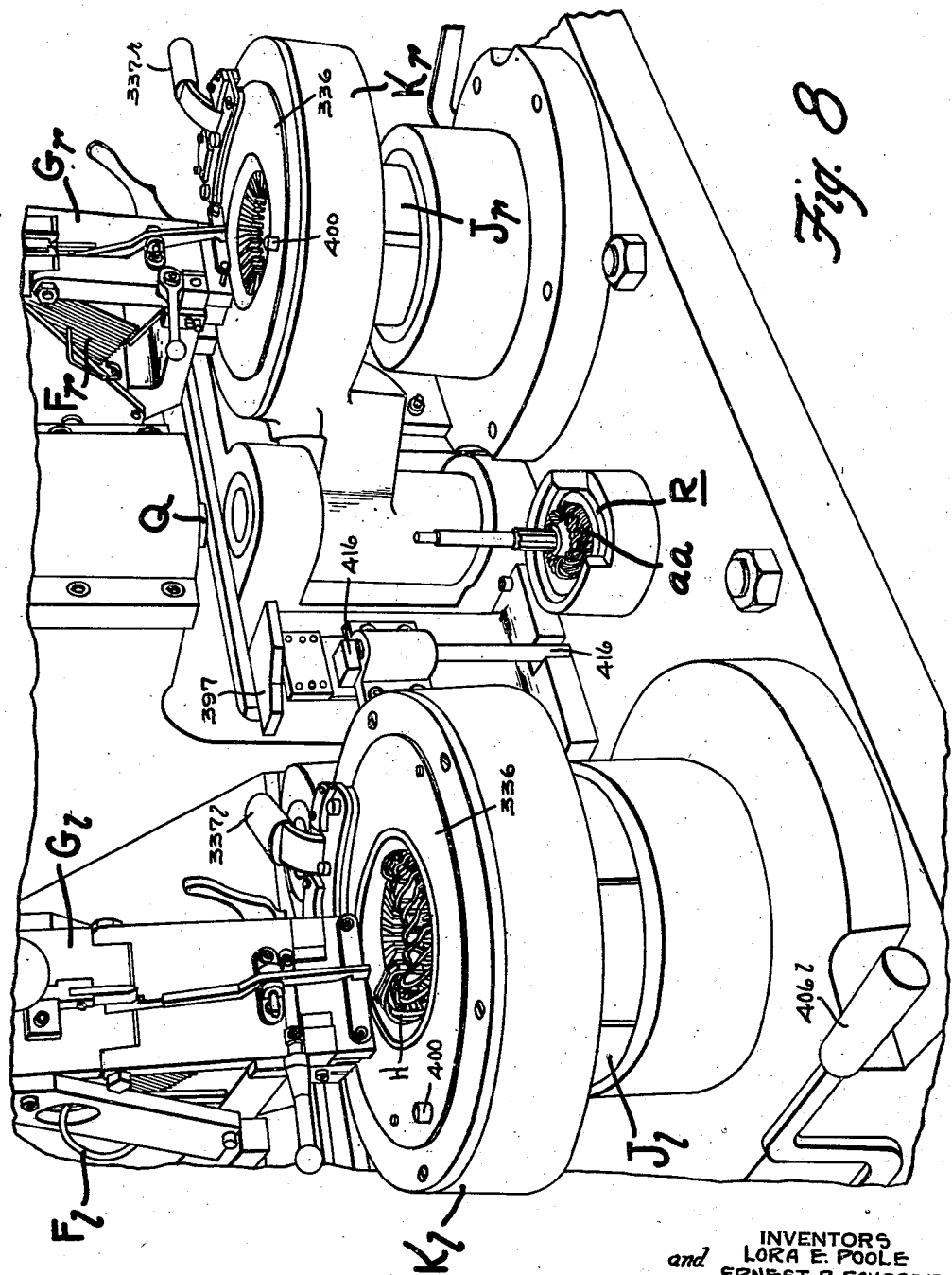

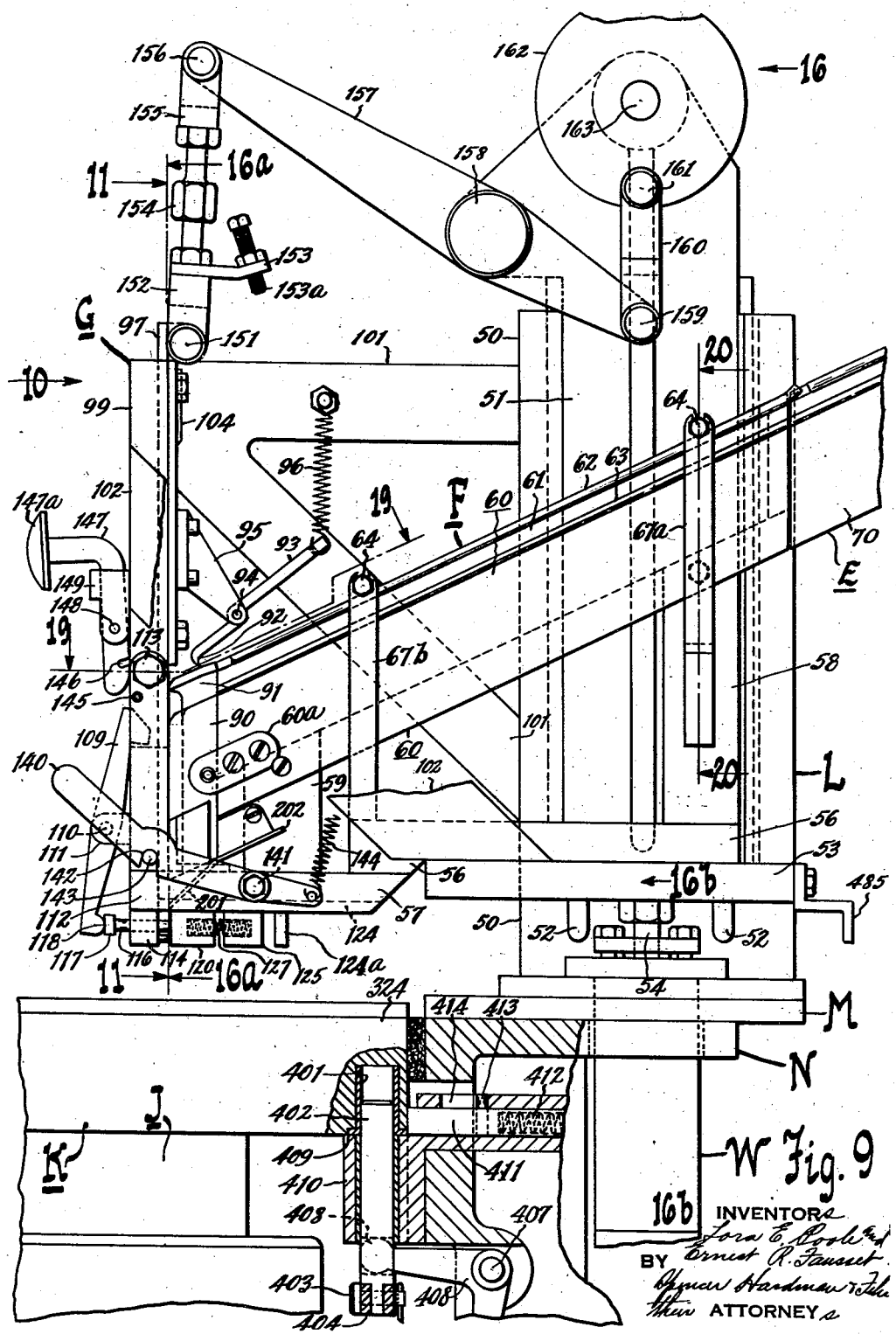

July 21, 1942.    L. E. POOLE ET AL    2,290,381
ARMATURE ASSEMBLING MACHINE
Filed Nov. 20, 1940    22 Sheets-Sheet 7

INVENTORS
Lora E. Poole &
Ernest R. Fausset
BY Spencer Hardman Fehr
their ATTORNEYS July 21, 1942.    L. E. POOLE ET AL    2,290,381
ARMATURE ASSEMBLING MACHINE
Filed Nov. 20, 1940    22 Sheets-Sheet 8
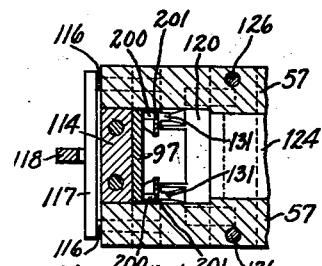
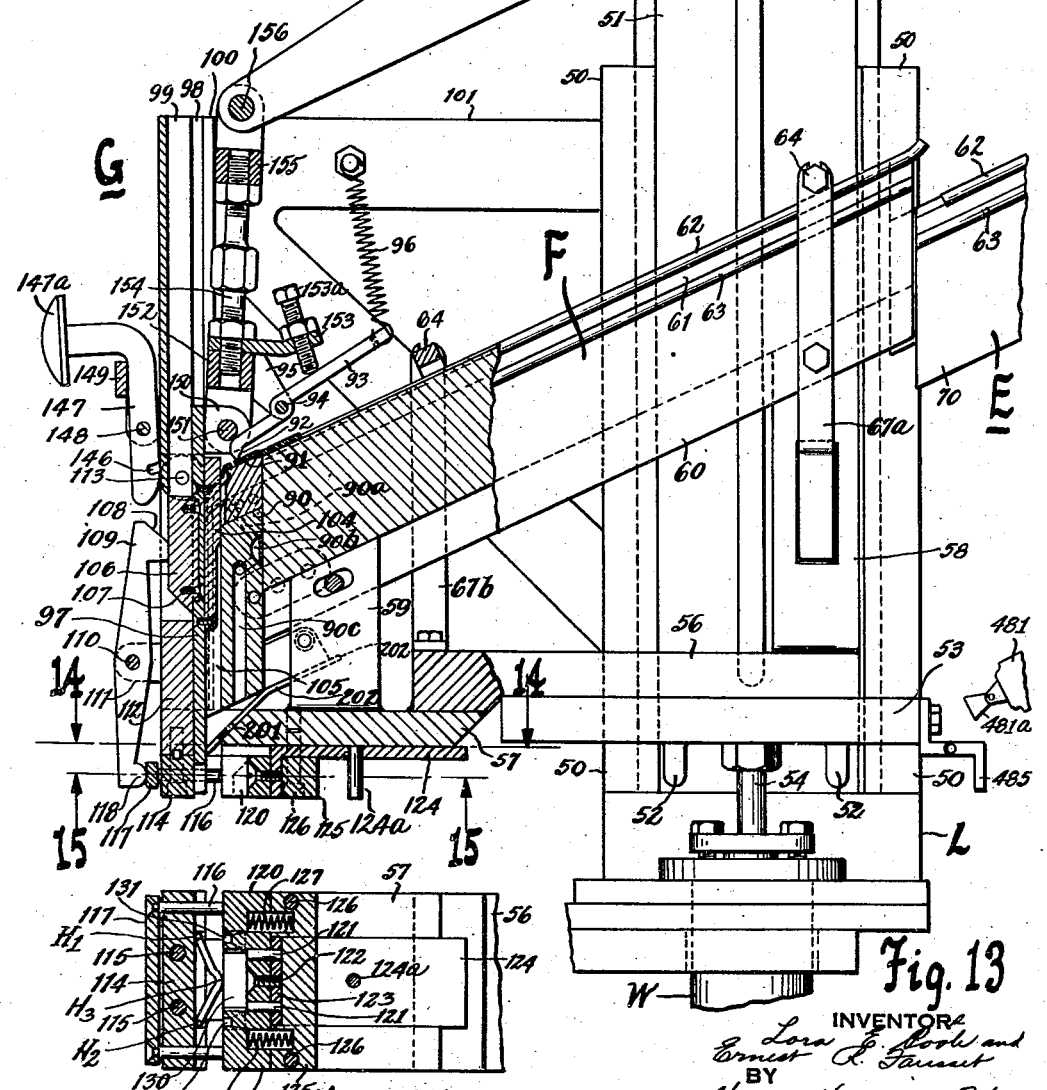

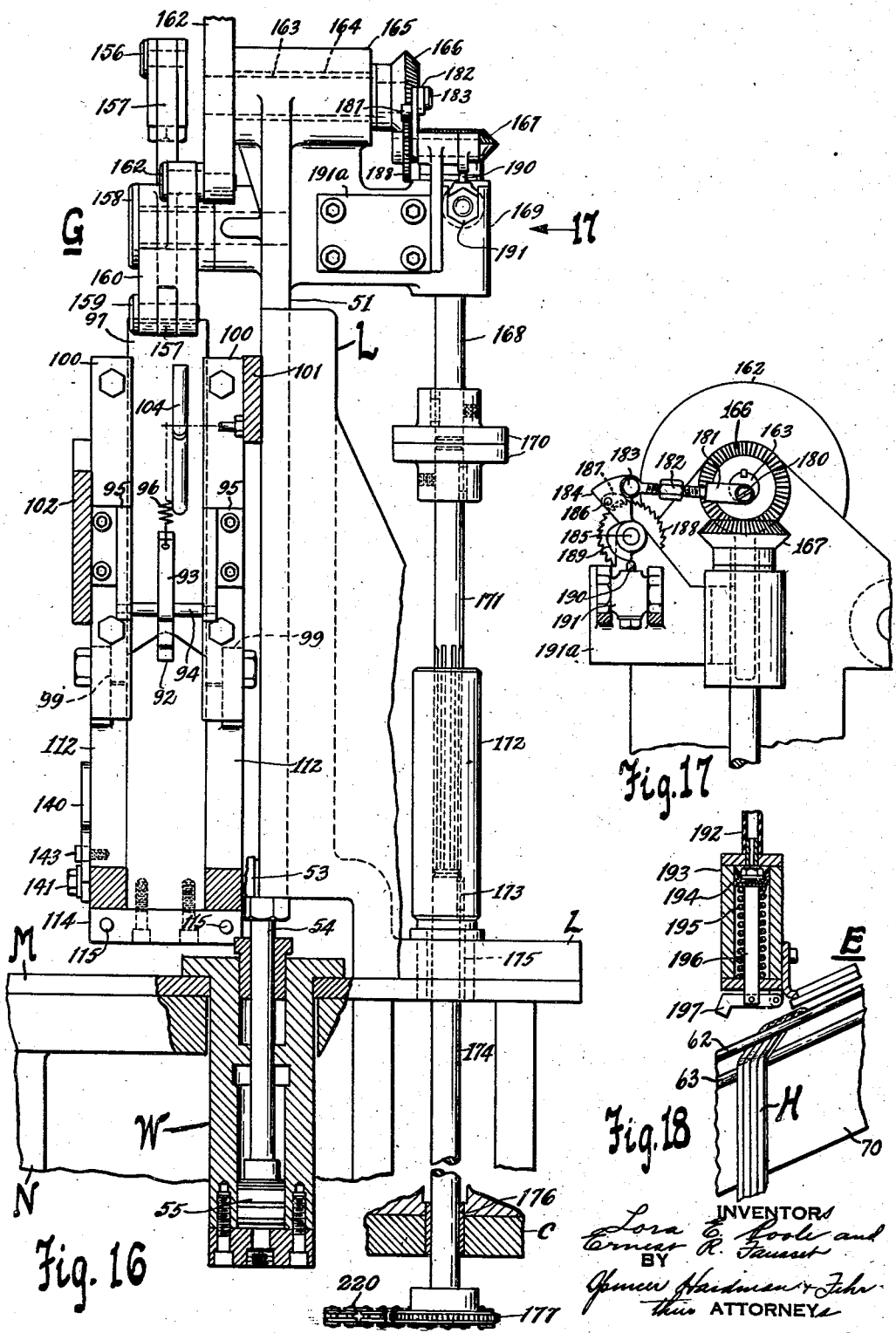

July 21, 1942.    L. E. POOLE ET AL    2,290,381
ARMATURE ASSEMBLING MACHINE
Filed Nov. 20, 1940    22 Sheets-Sheet 10

INVENTORS
Lora E. Poole and
Ernest R. Fausset
BY
Spencer, Hardman & Fehr
their ATTORNEYS

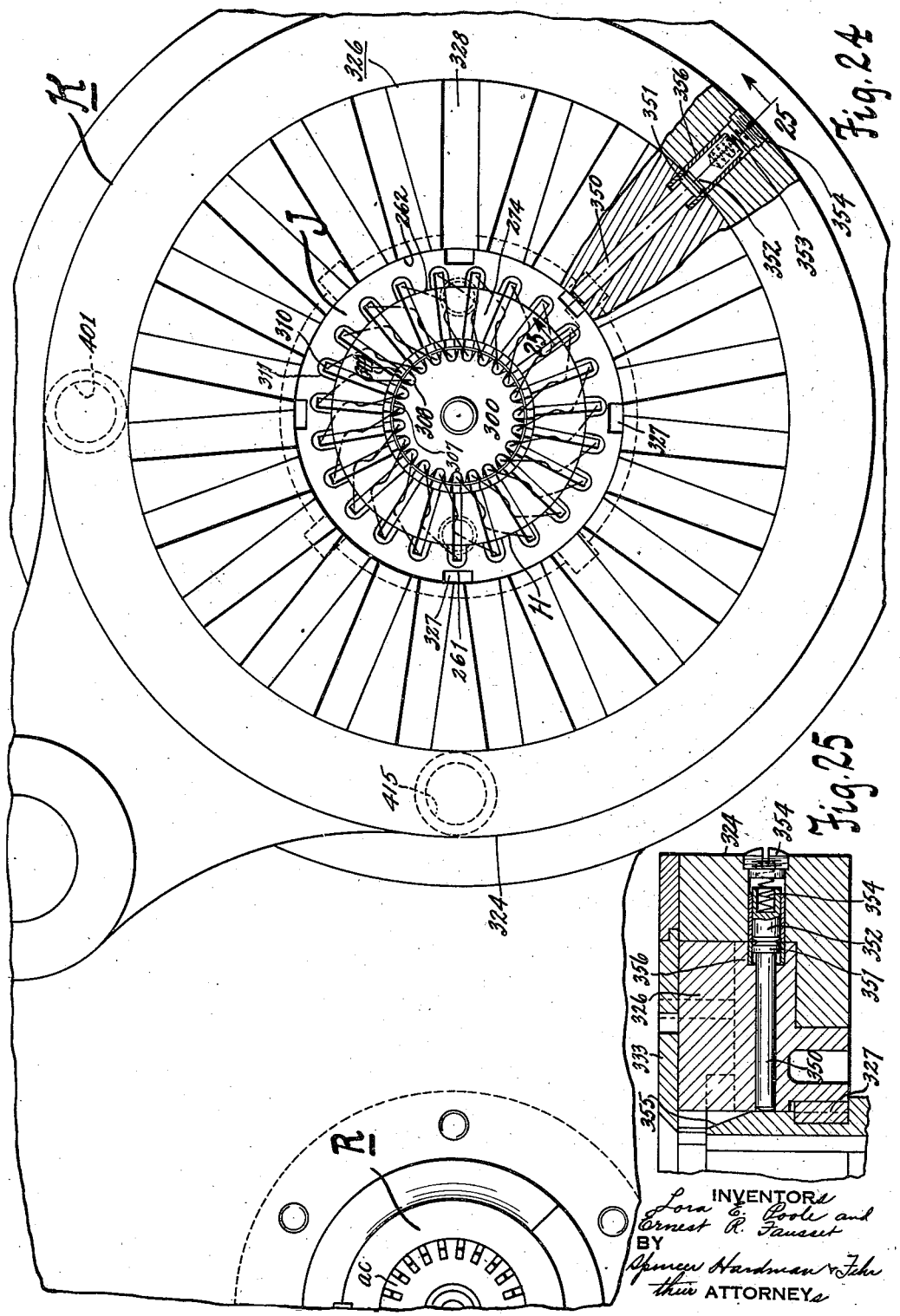

July 21, 1942.   L. E. POOLE ET AL   2,290,381
ARMATURE ASSEMBLING MACHINE
Filed Nov. 20, 1940   22 Sheets-Sheet 15

INVENTORS
Lora E. Poole &
Ernest R. Fausset
BY
Spencer Hardman & Fehr
their ATTORNEYS

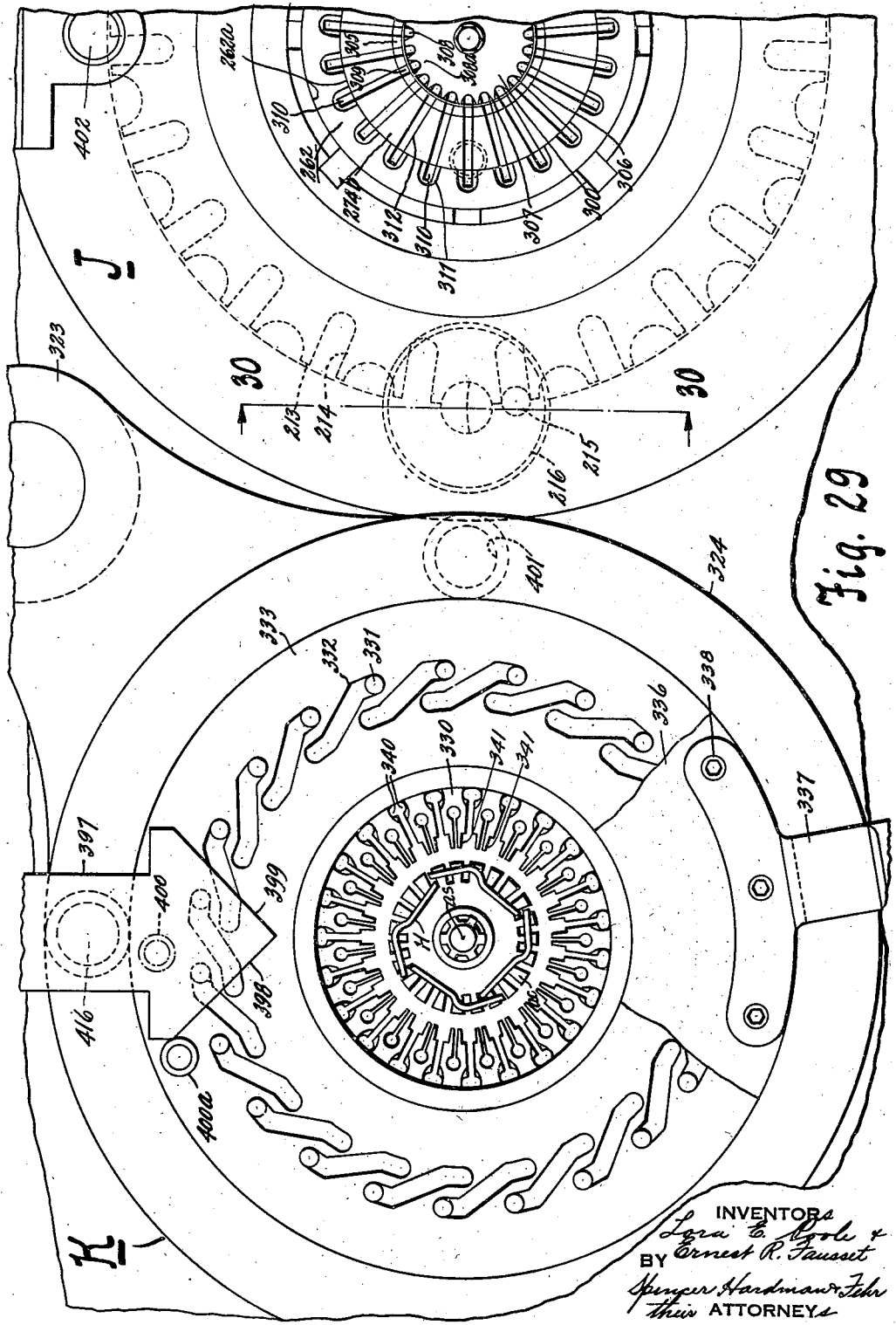

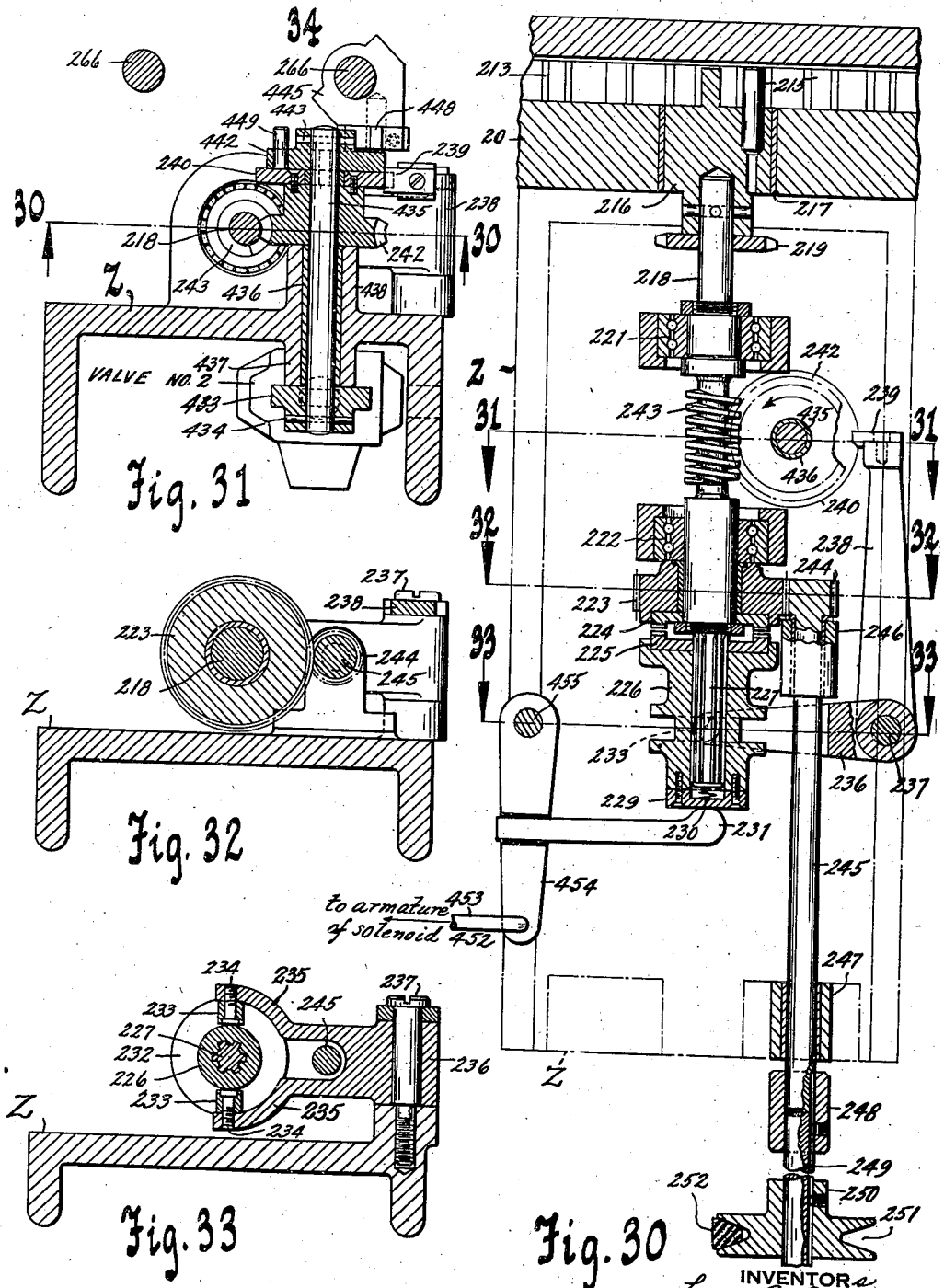

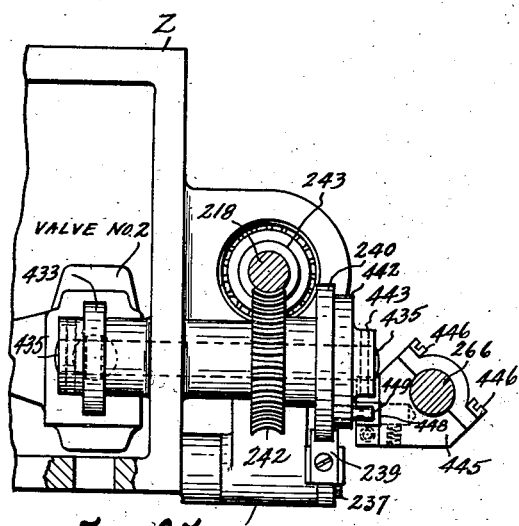
Fig. 37
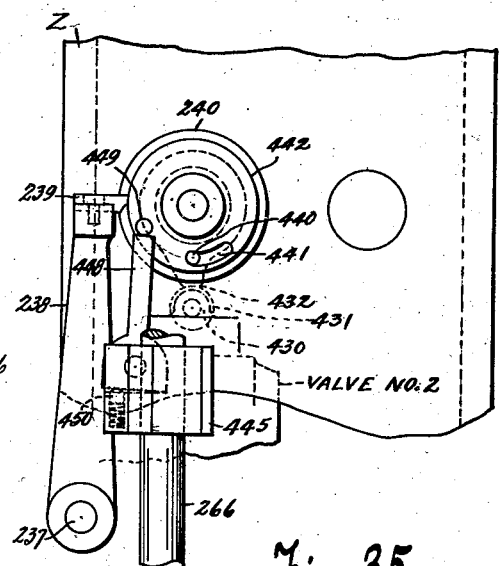
Fig. 35
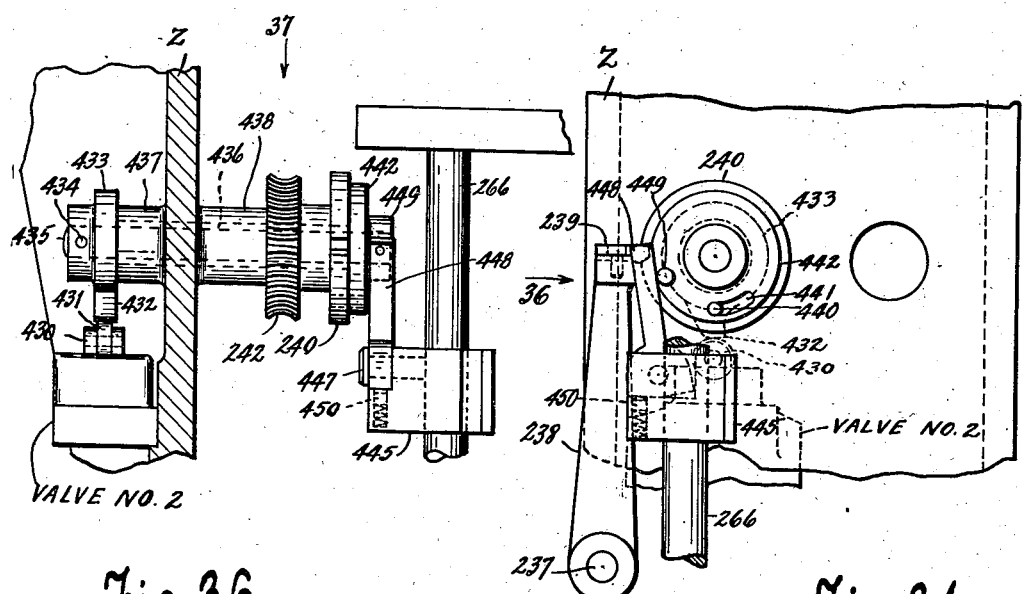
Fig. 36   Fig. 34

July 21, 1942. L. E. POOLE ET AL 2,290,381
ARMATURE ASSEMBLING MACHINE
Filed Nov. 20, 1940 22 Sheets-Sheet 19

INVENTORS
Lora E. Poole and
Ernest R. Fauscet
BY
Spencer Hardman & Fehr
their ATTORNEYS

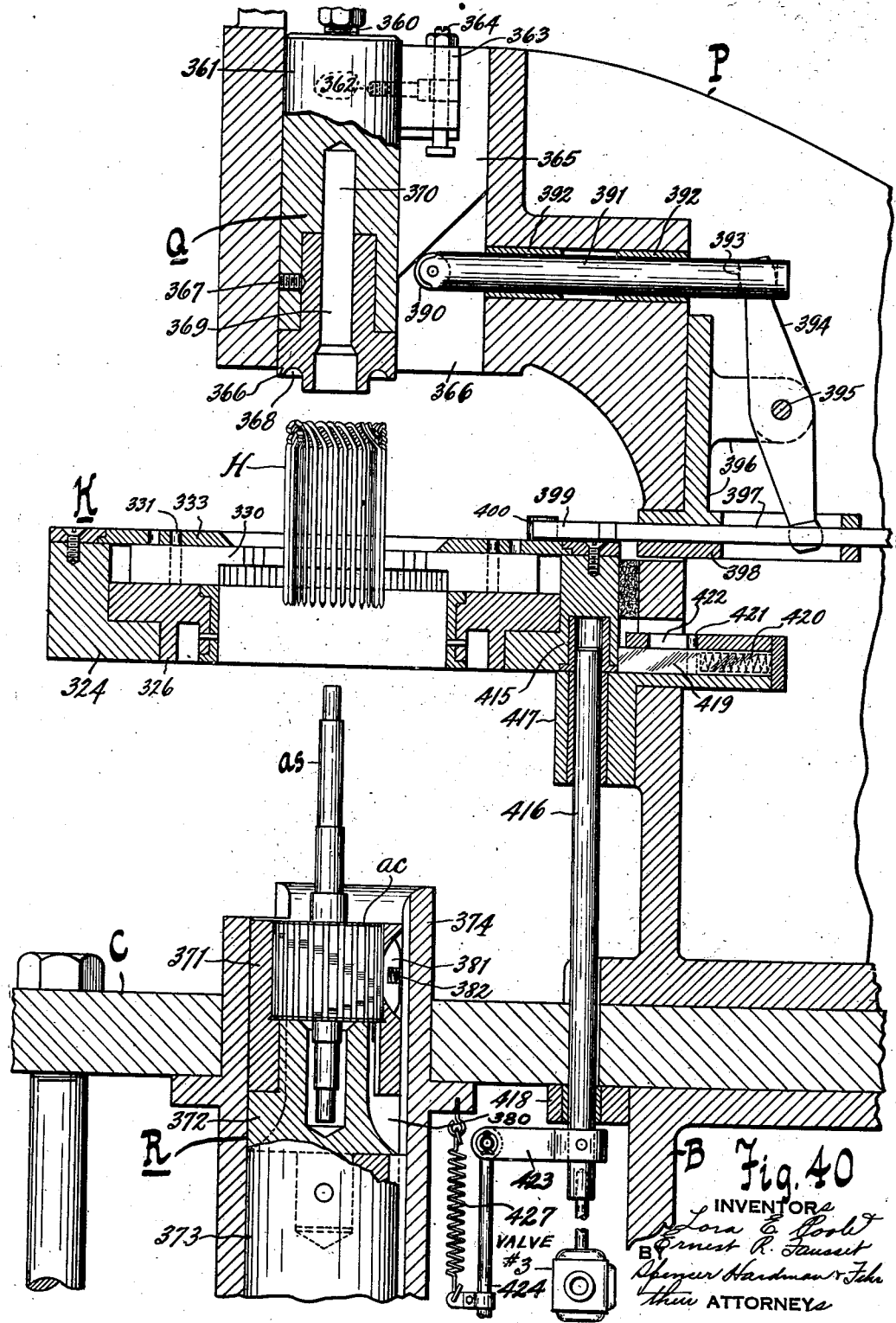

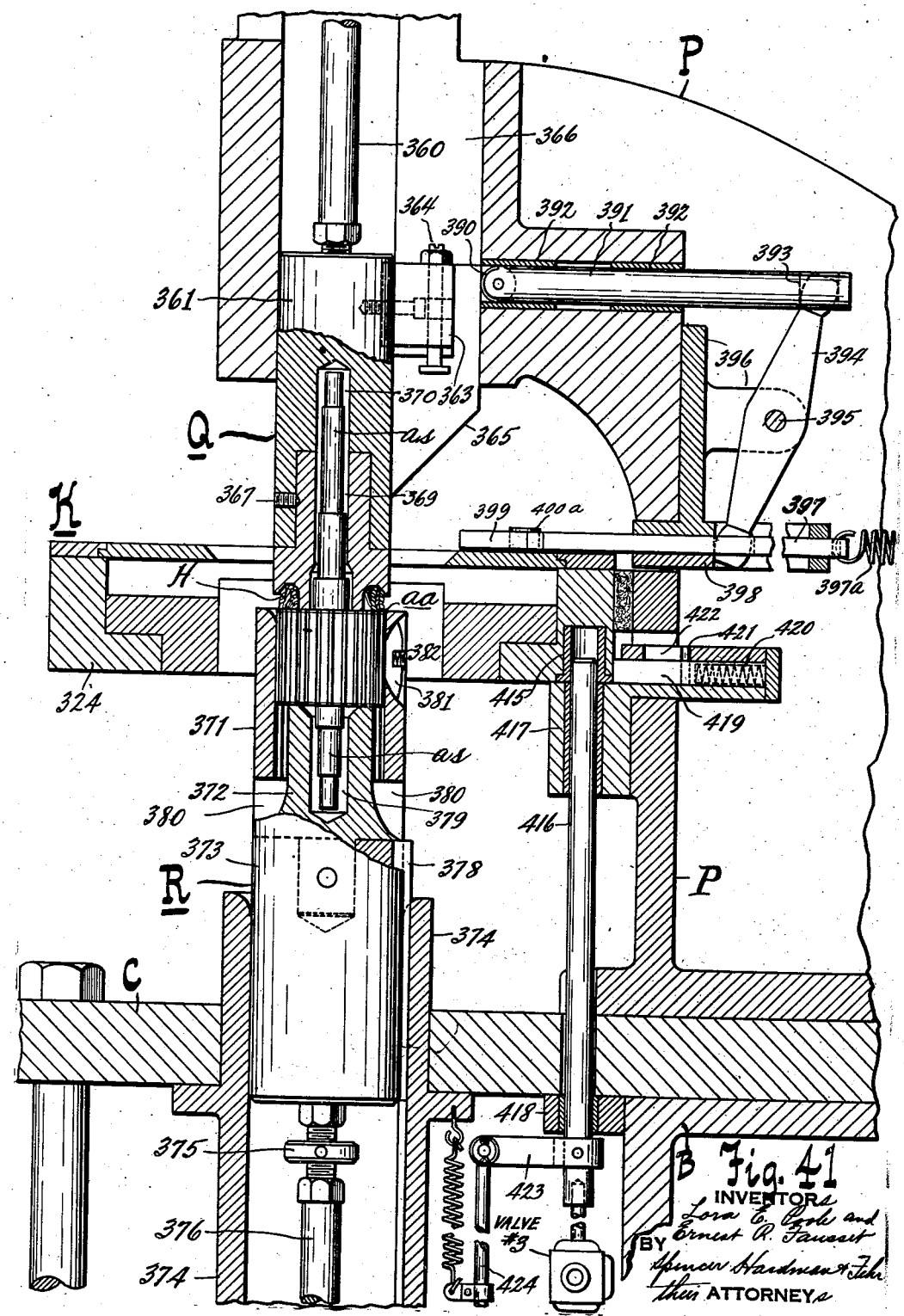

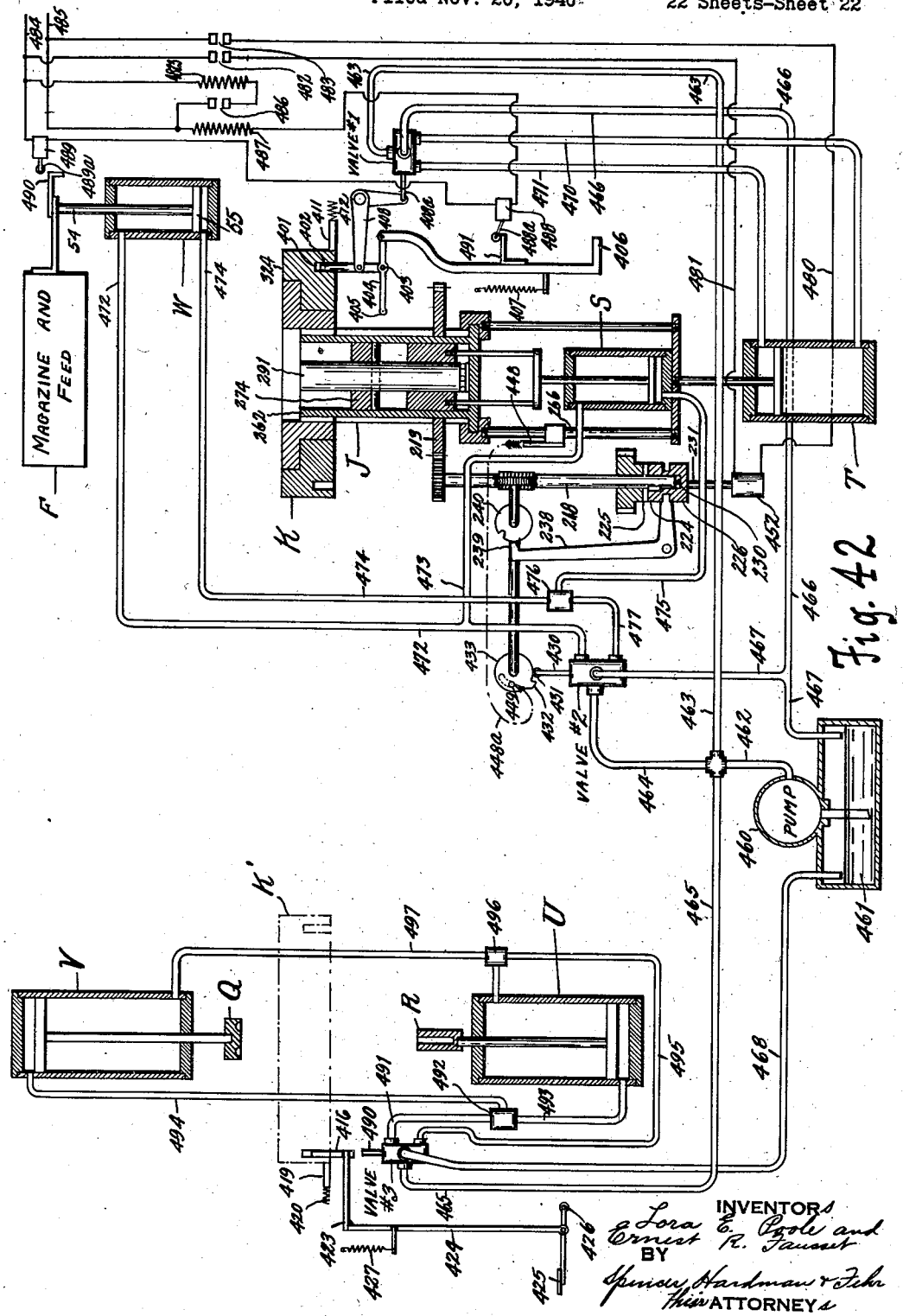

Patented July 21, 1942

2,290,381

UNITED STATES PATENT OFFICE 2,290,381

ARMATURE ASSEMBLING MACHINE

Lora E. Poole and Ernest R. Fausset, Anderson, Ind., assignors to General Motors Corporation, Detroit, Mich., a corporation of Delaware Application November 20, 1940, Serial No. 366,456

62 Claims. (Cl. 29—84)

This invention relates to the manufacture of bar wound armatures for dynamo electric machines and, more particularly to machines for assembling armatures for electric motors for starting internal combustion engines on automotive vehicles. Such armatures are provided with single turn armature coils each coil having two straight parallel coil sides or active portions joined by an intermediate yoke so shaped that one active coil side will occupy a portion of the armature core slot adjacent to the bottom of the slot while the other coil side occupies a portion of another slot adjacent to the periphery of the armature core. An armature coil of this type will be designated hereinafter as a "hairpin" on account of its resemblance to the ordinary hairpin.

The present invention is concerned with a method by which all of the hair-pins required for any particular armature assembly can be assembled simultaneously with an armature core by effecting relative longitudinal movement between the hairpins and the core, the legs of the hairpins passing endwise through the slots of the core. The hairpins are first assembled in an annular row with one leg of each hair-pin disposed in an inner annular row conforming to the location of the inner or bottom portion of the core slots. The other legs of the hair-pins are located in an outer annular row remote from the inner row. In this preliminary arrangement of the hairpins in an annular row, the hairpin yokes are spaced apart circumferentially. This arrangement permits placing the hairpins one at a time in this annular row since the hairpin yokes do not touch and therefore are not nested one within the other as they will be later on in the final assembly. The next step is to move all of the hairpin legs in the outer row simultaneously toward the inner row so as to bring all of these legs in the outer row into an annular row conforming to the locations of the outer portions of the armature core slots. During this movement of the outer row of hairpin legs, the other row of hairpin legs remain in the annular row in which they were first placed. The operation of moving the outer annular row of hairpin legs inwardly will be known hereafter as gathering. During this gathering operation the hairpin yokes become nested one within the other. The next step is to clamp the hairpins in the gathered position to a transferring device by which the entire group of hairpins is moved from the gathering device into alignment with a slotted armature core. Then relative longitudinal movement is effected between the armature core and the group of hairpins thereby causing all of the hairpin legs to be passed endwise into core slots, each slot receiving two hairpin legs.

The object of the invention is to provide a machine by which the method referred to can be carried out with great facility. The machine comprises a magazine having a chute to which the hairpins are delivered by a conveyor from a hairpin forming machine. The magazine is provided with a feed mechanism which discharges the hairpins singly to a gatherer which arranges a predetermined number of them for simultaneous endwise entry into the slots of the armature core. The gatherer cooperates with a transfer head having fingers for clamping the hairpin legs in the positions in which they are finally located by the gatherer. The transfer head is movable from the gatherer to the assembler in order to locate the hairpin legs in alignment with the slots of the armature core. The assembler effects relative longitudinal movement between the core and the group of hairpins while retracting the clamping fingers after the hairpin legs have been entered into the core slots.

It is a further object of the present invention to provide a duplex machine having two magazines, two gatherers, two transfer tables and the single assembler. While one set of elements, magazine, gatherer and transfer head are cooperating to prepare a group of hairpins for alignment with an armature core, the transfer head of the other set of elements (magazine, gatherer, transfer head) is moved by the operator into alignment with the assembler and the assembler thereafter is operated.

Further objects and advantages of the present invention will be apparent from the following description, reference being had to the accompanying drawings wherein a preferred embodiment of the present invention is clearly shown.

In the drawings:

Fig. 2 is a fragmentary perspective view showing the magazine in lower position. This view is taken from a position at the right side of the machine looking diagonally from the rear toward the front of the machine.

Fig. 3 is a perspective view similar to Fig. 2 showing the magazine in upper position in order to permit the gathering of the hairpins as shown.

Fig. 4 is a fragmentary perspective view showing the front of the magazine, gatherer and the transfer head. In this view the hairpins are being arranged in an annular row preliminary to gathering.

Fig. 5 is a view similar to Fig. 4 but showing the magazine elevated as in Fig. 3 and showing the completion of the gathering operation and the engagement of the hairpin legs by clamping fingers carried by the transfer head.

Fig. 6 is a fragmentary perspective view showing the transfer head moved into position for aligning the hairpin group with an armature core. Fig. 6 shows the movable assembler parts in retracted position.

Fig. 7 is a view similar to Fig. 6 showing the assembler parts in advanced position.

Fig. 8 is a perspective view showing the two sets of magazine, gatherer and transfer head devices on either side of the assembler. The gatherer on the left hand side is receiving an annular row of hairpins while the transfer head which was in the position shown in Fig. 7 has been moved back into alignment with the gatherer on the right hand side after the hairpin group, which it carried, has been assembled with a core.

Fig. 9 is a fragmentary side elevation of the right hand magazine unit which is shown in perspective in Fig. 2. In this view certain parts are shown in section for sake of clearness.

Figures 10, 11, 12:
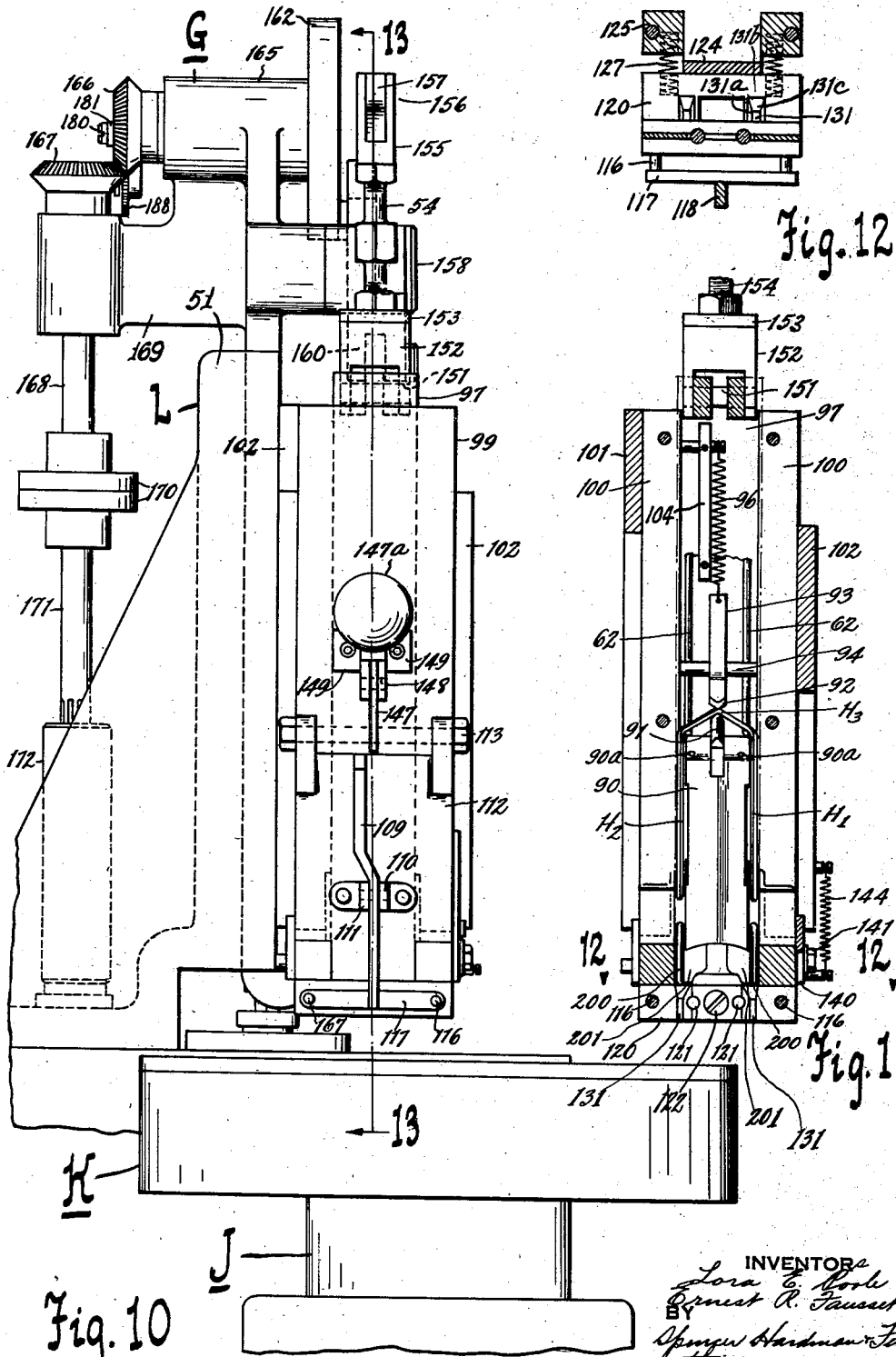

Fig. 10 is a front elevation of the magazine shown in Fig. 9 and is a view taken in the direction of the arrow 10 of Fig. 9. In Figs. 9 and 10 the feed slide is up.

Fig. 11 is a sectional view on the line 11—11 of Fig. 9.

Fig. 12 is a sectional view on the line 12—12 of Fig. 11.

Fig. 13 is a side elevation of the magazine with the feed slide down, and parts in section are taken generally on the line 13—13 of Fig. 10 but it will be understood that in Fig. 13 the feed slide is down whereas in Fig. 10 the slide is up.

Figs. 14 and 15 are sectional views taken, respectively, on the lines 14—14 and 15—15 of Fig. 13.

Fig. 16 is a view looking in the direction of the arrow 16 of Fig. 9; and the sectional parts are taken on the lines 16a—16a and 16b—16b of Fig. 9.

Fig. 17 is a fragmentary elevational view looking in the direction of arrow 17 of Fig. 16.

Fig. 18 shows a vertical sectional view of a pneumatic latch associated with the hairpin chute.

Figure 19:
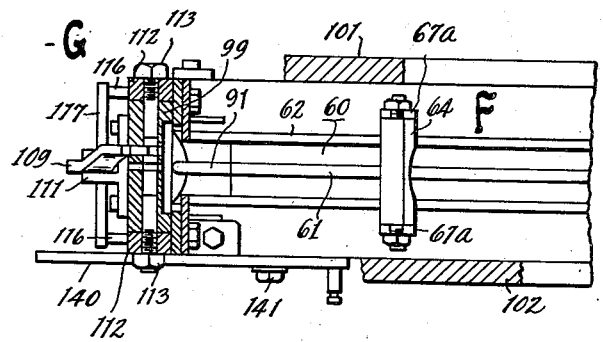
Figure 20:
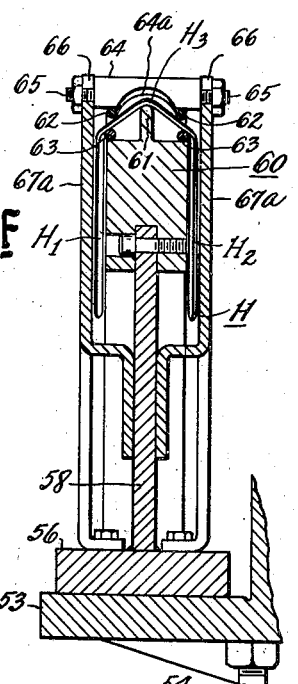

Figs. 19 and 20 are sectional views taken respectively, on the lines 19—19 and 20—20 of Fig. 9.

Figure 20A:
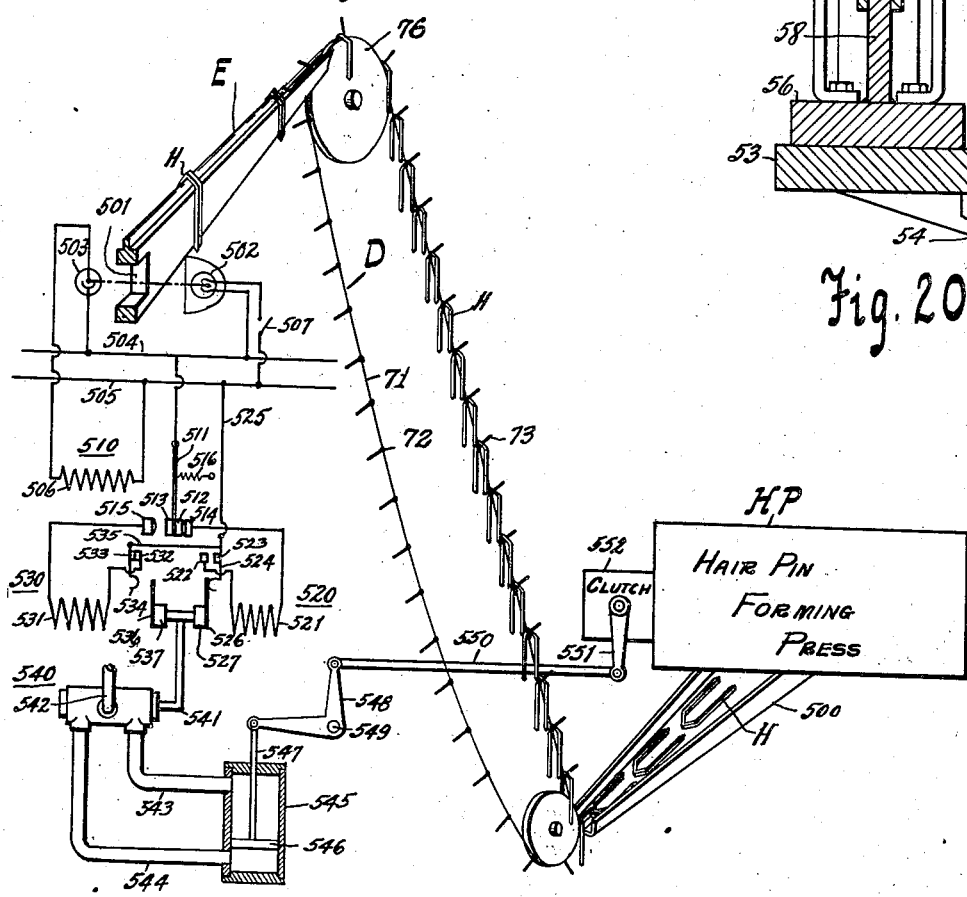

Fig. 20a is partly a sectional view through the magazine chute showing the relation thereto of a photoelectric cell which controls the press which forms the hairpins supplied to the magazine.

Fig. 20a includes a diagram of the press and the conveyor from the press to the magazine.

Figure 21:
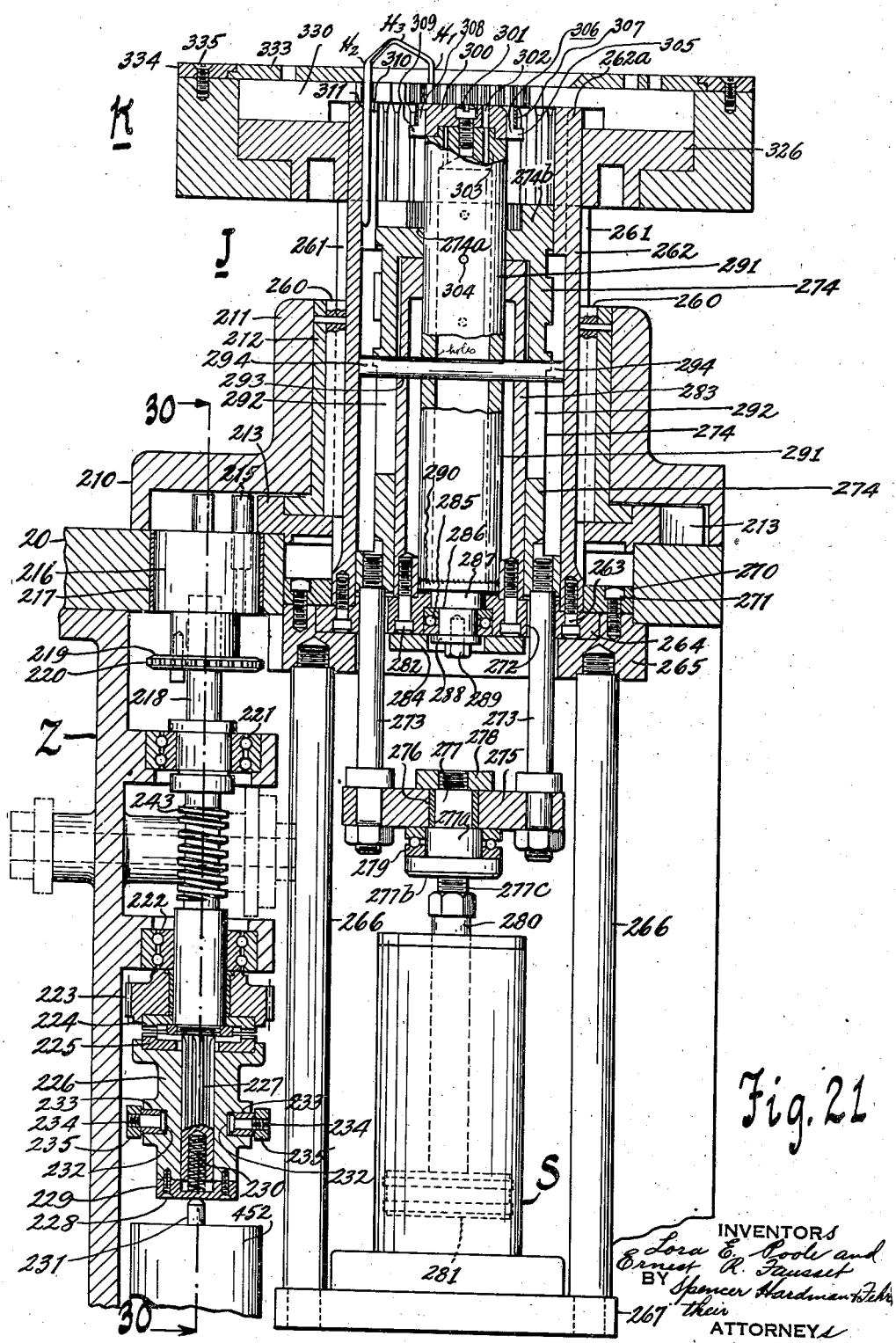

Fig. 21 is a fragmentary longitudinal section view on a vertical plane showing the gatherer and transfer head in condition for receiving the hairpins in the preliminary row as shown in Fig. 4.

Figure 22:
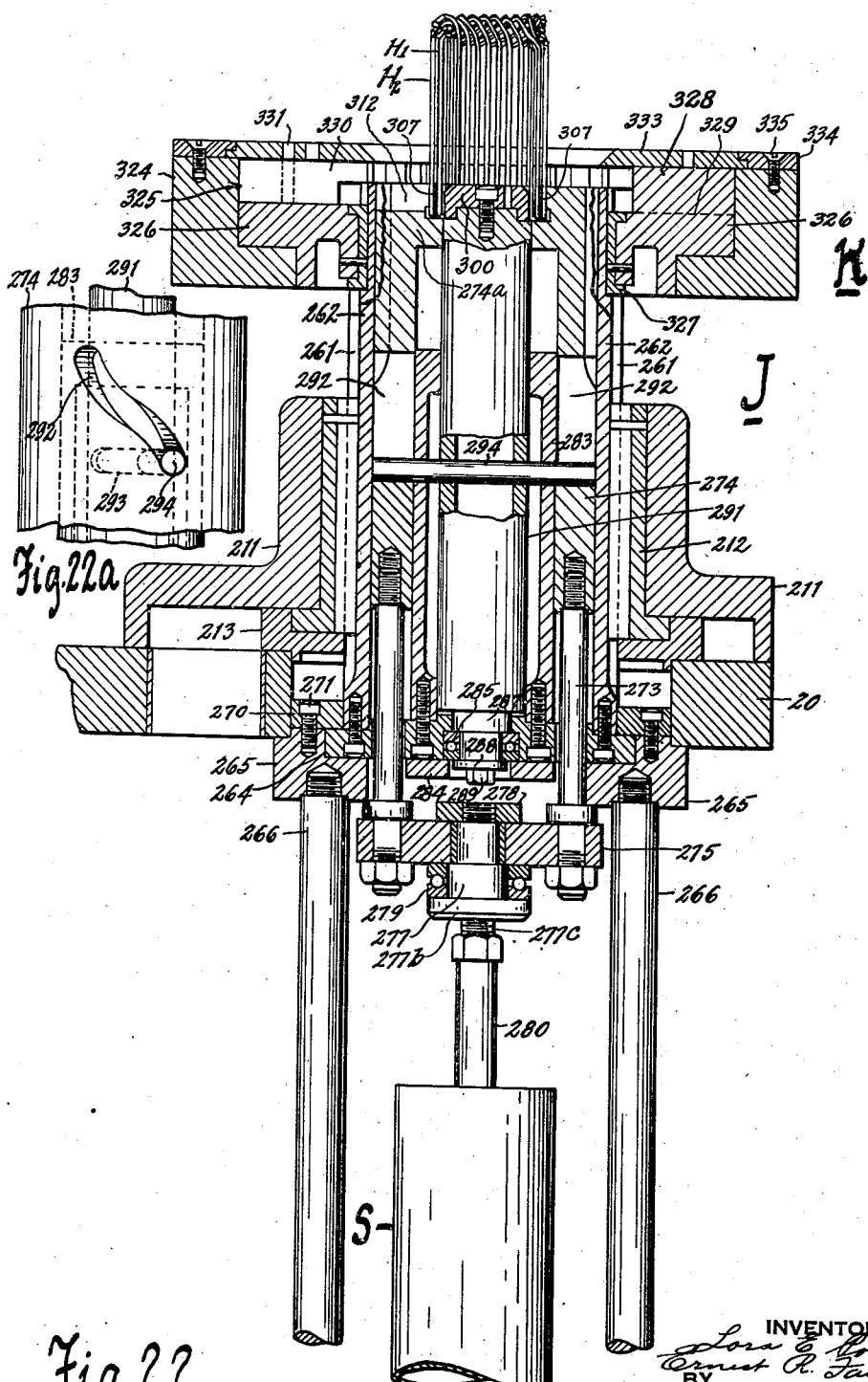

Fig. 22 is a view similar to Fig. 21 showing the location of the gatherer after the gathering operation has been performed as shown in Fig. 5.

Fig. 22a is a fragmentary view taken in the direction of arrow 22a of Fig. 22.

Figure 23:
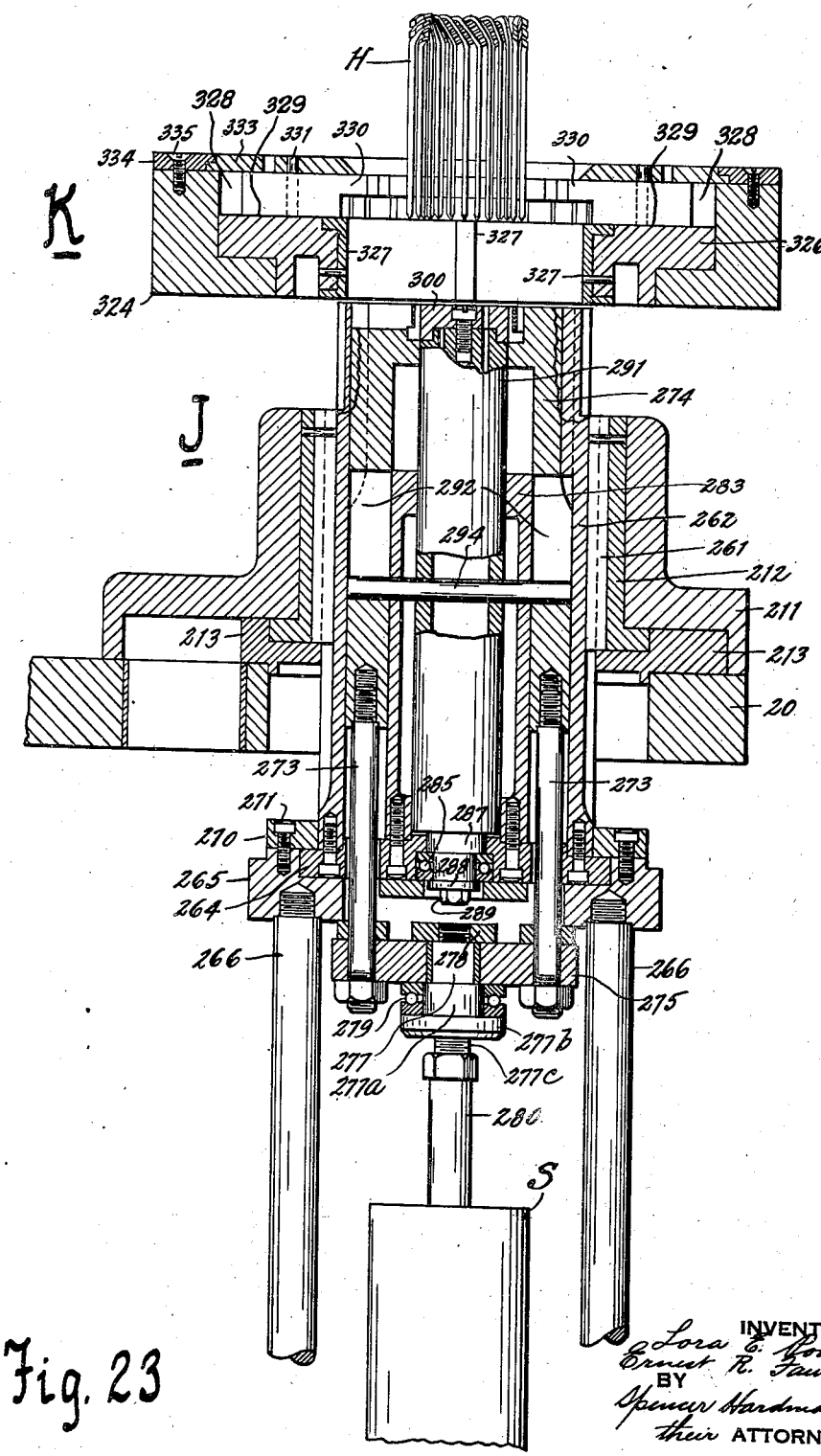

Fig. 23 is a view similar to Fig. 22 showing the clamping fingers of the gathering head in engagement with the hairpin legs and the gathering head moved below the underside of the transfer head so that this transfer head may be moved into alignment with the assembler.

Fig. 24 is a plan view of the gatherer and transfer head as shown in Fig. 4, the transfer head cover and clamping sides having been removed in order to show the upper end of the gathering head more clearly.

Fig. 25 is a sectional view on line 25—25 of Fig. 24.

Figure 26:
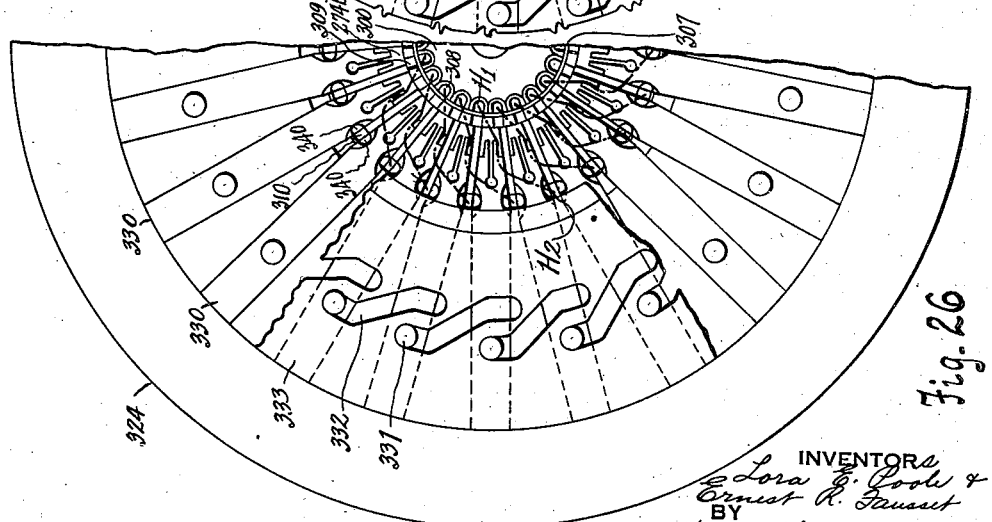

Fig. 26 is a fragmentary plan view of the transfer head and gatherer showing a portion of the transfer head cover plate and the clamping fingers in unretracted position and the hairpins in preliminary locations before gathering.

Figure 27:

Fig. 27 is a fragmentary plan view of parts shown in Fig. 26. Fig. 27 shows the clamping fingers of the transfer head still in retracted position, and the hair pins in final positions corresponding to the locations of the armature core slots.

Figure 28:
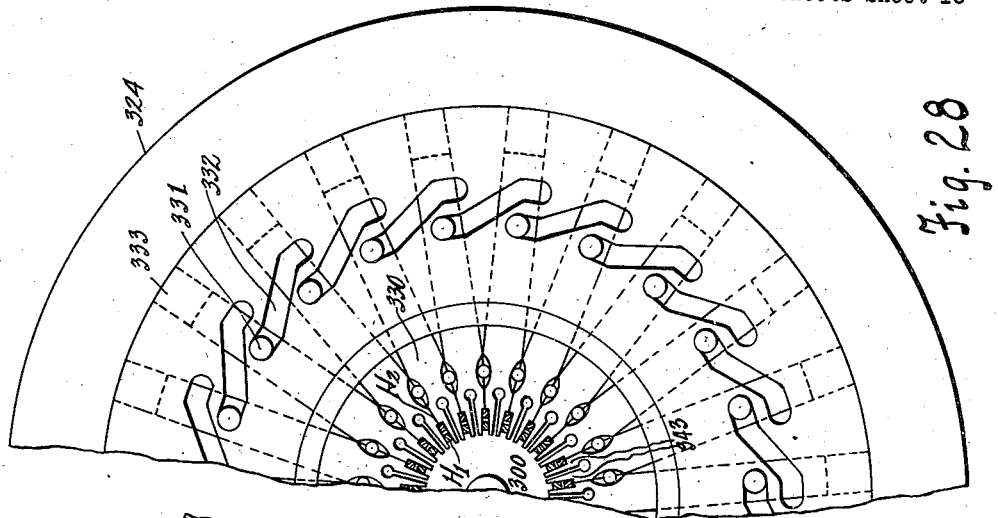

Fig. 28 is a view similar to Fig. 27 and shows the clamping fingers advanced to engage the hairpin legs.

Fig. 29 shows a plan view of the transfer head after it has been moved into alignment with the assembler and after the assembler has moved the hairpins into the armature core slots. In this view the transfer head cover plates have been broken away to show the cam or scroll plate which moves the clamping fingers into retracted position. Fig. 29 shows also a fragment of the top of the gathering head from which the transfer head has been moved.

Fig. 30 is a sectional view on the line 30—30 of Figs. 29 and 31.

Figs. 31, 32 and 33 are sectional views taken, respectively, on lines 31—31, 32—32 and 33—33 of Fig. 30.

Fig. 34 is a view looking in the direction of arrow 34 in Fig. 31.

Fig. 35 is a view similar to Fig. 34 showing certain parts in other positions.

Fig. 36 is a view in the direction of the arrow 36 of Fig. 34.

Fig. 37 is a view in the direction of the arrow 37 of Fig. 36.

Figure 38:
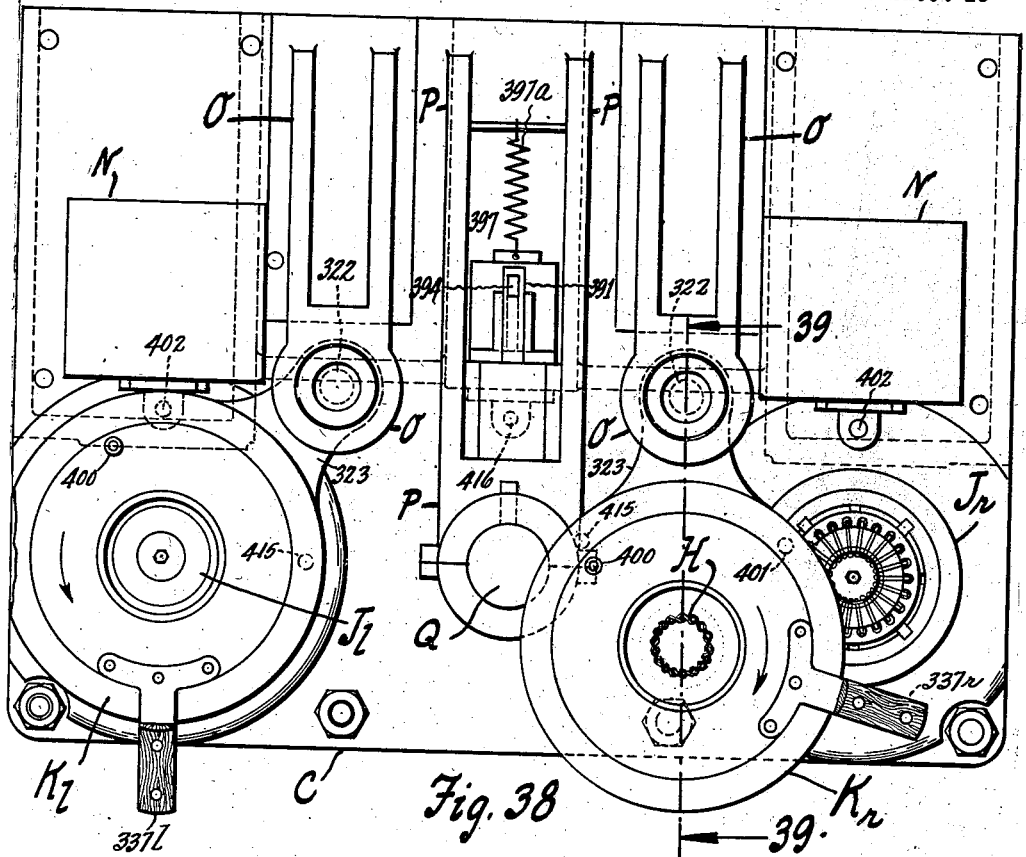

Fig. 38 is a plan view of supports for the magazines, transfer heads and assembler.

Figure 39:
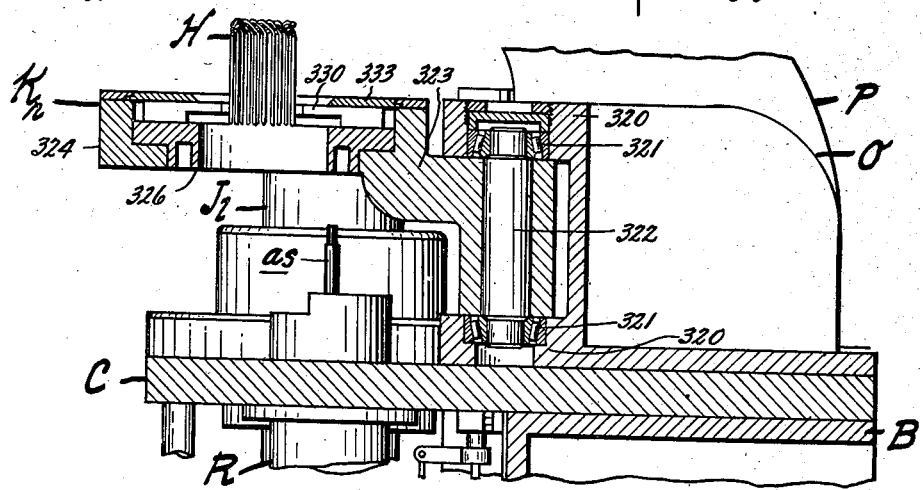

Fig. 39 is a sectional view on the line 39—39 of Fig. 38.

Fig. 40 is a vertical sectional view through the assembling apparatus and transfer head as shown in Fig. 6. The section is taken in a vertical plane through the axis of the armature as shown in Fig. 6.

Fig. 41 is a view similar to Fig. 38 showing the assembling apparatus in the position as shown in Fig. 7.

Fig. 42 is a diagram of electrical and hydraulic apparatus for controlling the operations of the machine.

General construction

Figure 1:
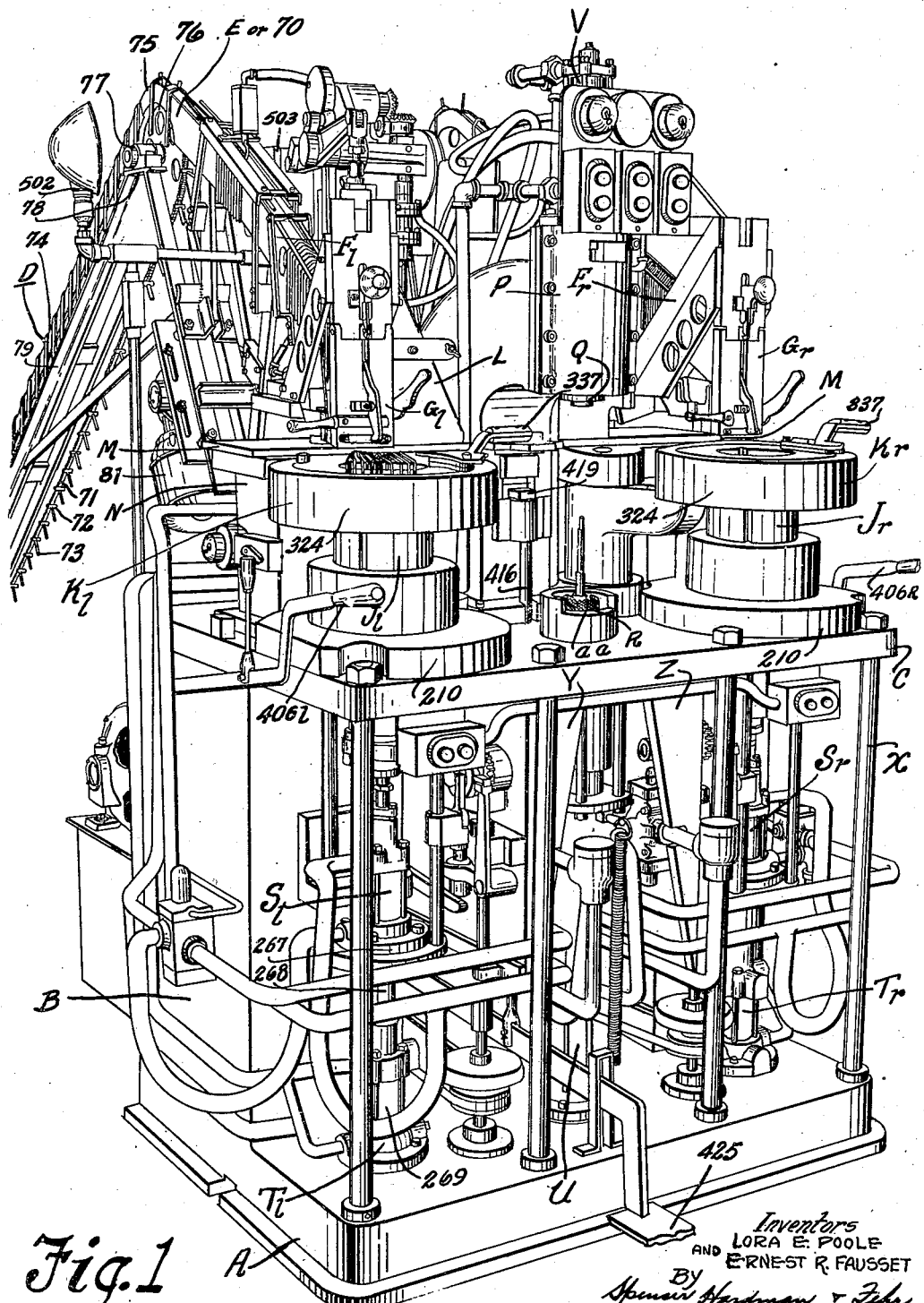
Fig. 1 is a perspective view of the machine looking to the front and left side.

Referring to Fig. 1, the machine comprises a base casting A supporting a back pedestal B in the form of a rectangular box. Pedestal B has a depth horizontally about one-half of the depth of the base A and a horizontal width approximately the same as the width of the base A as viewed from the front of the machine. Pedestal B supports a table C. The front wall of pedestal B supports certain operating mechanisms; and the back wall is open to provide a housing for certain control apparatuses shown diagrammatically in Fig. 42. Table C supports a portion of a conveyor mechanism D which delivers hairpins H to a chute E leading into a magazine F. The hairpins H are removed one at a time by a feed mechanism G and are caused to descend one at a time through a transfer head K and into a gatherer J. There are two sets of elements F, G, J and K, one on the right side of the machine and the other on the left. Each magazine F is supported by a pedestal L, in turn supported by a plate M carried by a frame N. There are two frames O each providing a pivotal support for a transfer head K. Between the two frames O is located a pedestal P providing a support for the upper part of the assembling mechanism designated as Q. The lower part of the assembler, designated as R, is supported by the table C.

Each gatherer J is operated by pistons cooperating with hydraulic cylinders S and T. The assembling apparatus R carried by table C is operated by a piston cooperating with a hydraulic cylinder U. The two cylinders S, the two cylinders T and the cylinder U and controls associated therewith are located between the base A and the table C in the front of the machine as shown in Fig. 1. The pedestal P supports a cylinder V cooperating with a piston for operating the upper portion Q of the assembling apparatus. As viewed in Figs. 9 and 16, each plate M supports a cylinder W for raising and lowering a magazine F.

The front edge of the table C is supported by rods X connected with the base A. The table C is supported also by pedestals Y and Z, which serve to support some of the operating and control mechanisms as shown in Figs. 30 to 37.

Magazine F

Referring to Figs. 2, 3, 9 to 20, the pedestal L provides ways 50 which guide for vertical sliding movement the magazine unit F. More particularly the ways 50 support a frame 51 having integral brackets 52 supporting a table 53 which is attached to the upper end of a piston rod 54 connected with a piston 55 (Fig. 42) in the cylinder W which is attached to plate M mounted on frame N. (Figs. 13 and 16.) To the table 53 is attached a plate 56 welded to a plate 57. Plate 56 supports a pedestal 58. Plate 57 supports a pedestal 59. Pedestals 58 and 59 support a chute 60 for supporting a plurality of hairpins H as shown in Figs. 2 and 3. From the chute 60, the hairpins H are discharged singly by a feed mechanism G to be described. The yoke portions H3 of each hairpin H rests upon a rib 61 or flange extending from the chute 60, the legs or branches H1 and H2 of the hairpins extending downwardly along the sides of the chute 60. The hairpins are retained in proper position due to the fact that the yoke portions H3 are required to slide between pairs of rods, each pair comprising a rod 62 and a rod 63. The rods 63 are supported directly by the chute 60. The rods 62 are welded to a cross member 64 having threaded ends 65 received by notches 66 in brackets 67a and 67b. The brackets 67a are attached to the pedestal 58. The brackets 67b are attached to the plate 56. The cross members 64 are notched at 64a to provide clearance for the uppermost portion of each hairpin yoke H3.

The chute 60 is an extension of an inclined bar E or chute 70 upon the upper end of which the conveyor D deposits hairpins H as shown in Fig. 1.

The moving part of the conveyor D comprises a chain 71 having spaced lugs 72. From each lug 72 there extends a pin 73 which pushes a hairpin upwardly along a track 74 and then around a curved track 75 which is an extension of the chute E or 70. The chain 71 passes around suitable sprocket wheels indicated at 76. The sprocket 76 is mounted on a shaft journalled in a bearing 77 mounted on a plate 78 welded to the juncture of frames 79 and 80. The lower end of frame 79, not shown, is supported on the floor adjacent to the discharge chute from the hairpin forming press HP in Fig. 20a. It will be understood that the hairpins are discharged from press HP with yokes foremost so that the hairpins will be conveyed upwardly on the conveyor track 74 and then down along the chutes 70 and 60 in the manner shown. The lower end of the frame 80 is supported by the table C. An electric motor 81 is connected with the sprocket 76 in any suitable manner in order to drive the same.

Referring again to Fig. 13, it will be seen that the chute 60 terminates in a block 90 having a mid-rib or flange 91 forming a continuation of the flange 61 of the chute 60. However, the upper portion of this flange 91 is slightly offset upwardly from the flange 61. The purpose of this is to retard the descent of the hairpins along the chute 60. As shown in Fig. 13 the hairpin next to the lowest one is located adjacent the finger portion 92 of a lever 93 pivoted at 94 upon a fixed bracket 95. Lever 93 is normally urged clockwise by spring 96 so that normally the finger 92 engages the yoke of said hairpin. In this figure the descent of the lowest hairpin is obstructed by a feed bar 97 which is received by grooves 98 provided by a plate 99 to which plates 100 are attached as shown in Fig. 16 thereby providing ways for guiding the bar 97. Bar 97 is a part of the hairpin feed mechanism G. The way plates 100 support the brackets 95 which support the shaft 94 carrying the lever 93. The plate 99 is fixed to brackets 101 and 102 attached to the frame 51. Bar 97 supports a block 104 received by a notch 105 in the block 90. Bar 97 is attached to a cam block 106, the lower edge of which is beveled at 107 to engage the beveled upper edge 108 of a lever 109 pivoted upon a rod 110 supported between ears 111 provided by a plate 112. The plate 112 is pivotally attached to the plate 99 by screws 113. Plate 112 supports at its lower end a block 114 attached by screws 115. Block 114 supports rods 116 attached to a plate 117 adapted to be engaged by the lower end 118 of lever 109. The rods 116 are adapted to engage a block 120 attached by dowel pins 121 and a screw 122 to the downwardly extending flange 123 of a plate 124 which moves horizontally along the underside of the plate 57 and is guided for such movement by a block 125 having a notch for receiving the plate 124. Block 125 is secured to plate 57 by screws 126. The block 120 is normally urged against the block 114 by springs 127 as shown in Fig. 12. Block 120 is provided with a recess 130 for receiving the hairpin yoke H3 and with notched lugs 131 each for receiving a hairpin leg H1 or H2.

The plate 112 is retained normally in vertical alignment with the plate 99 by means of a latch comprising a latch lever 140 (Fig. 9) pivoted upon a screw 141 attached to plate 57. Lever 140 has a notch 142 for receiving a pin 43 on plate 112. A spring 144 urges the lever 140 counterclockwise so that the lever notch 142 normally receives the pin 143 thus latching the plate 112 in operating position. If a hairpin should jam between the block 90 and the plate 112 the lever 140 can be retracted from the pin 143 and the plate 112 moved away from the block 90 into a horizontal position until a stud 145 carried by the plate 112 is received by a notch 146 in a latching lever 147 pivoted at 148 upon a bracket 149 carried by plate 99. Lever 147 has a knob 147a which serves as a weight tending to urge the lever 147 counter-clockwise. Therefore, when the plate 112 has been brought into a horizontal position, the stud 145 will strike the lever 147 and cam it clockwise until the stud 145 comes into alignment with the notch 146, whereupon the weight of the knob 147a will cause the lever 147 to move counter-clockwise to hold the plate 112 in the horizontal position. To release the plate 112 in order that it may be restored to vertical position, the operator pushes upon the knob 147a whereupon the plate 112 is released and it descends and causes the rod 143 to strike the lower edge of the lever 140 and cam the same upwardly against the action of the spring 144 until the plate 112 is in the normal vertical position, whereupon its rod 143 registers with the notch 142 of lever 140 and lever 140 returns to latching position under the action of the spring 144.

The feed bar 97 is provided near its upper end with a pair of lugs 150 supporting a rod 151 attached to a notched lug 152 which together with a plate 153 are attached to the lower threaded end of a turnbuckle 154 having its upper end threaded into a notched block 155 carrying a pin 156 by which the block is attached to a lever or walking beam 157 pivoted at 158 upon the plate 51. Lever 157 is connected by a pin 159 with a link 160 connected by a pin 161 with a crank disc 162 mounted on a shaft 163 journalled in a bearing 164 provided by a bearing bracket 165 integral with the plate 51. Shaft 163 carries a bevel gear 166 meshing with a bevel gear 167 connected with a vertically disposed shaft 168 journalled in a bearing bracket 169 also integral with the plate 51. Shaft 168 is connected by a coupling 170 with a shaft section 171 longitudinally splinedly connected with a shaft sleeve 172 keyed at 173 to a shaft section 174 journalled in a bearing 175 provided by pedestal L and in a bearing 176 provided by Table C. At its lower end the shaft 174 carries a sprocket wheel 177 driven in a manner to be described and coordinated with rotary movements of parts associated with the gatherer J and the transfer head K. Referring to Fig. 17 the shaft 163 carries a crank pin 180 connected by clevis 181 and turnbuckle 182 and pin 183 with a ratchet lever 184 loosely journalled on a shaft 185. Lever 184 carries a pin 186 pivotally supporting a pawl 187 engageable with a ratchet 188 pinned to the shaft 185. To the shaft 185 there is also pinned a cam 189 engageable with the operating member 190 of a valve 192. It is apparent that after a predetermined number of revolutions of the shaft 163 have taken place, the valve 191 will open for the purpose of causing air to flow through a pipe 192 (Fig. 18) into a cylinder 193 thereby causing a piston 194 to move downwardly against the action of the spring 195 and to cause the rod 196 to move a finger 197 downwardly for the purpose of engaging a hairpin descending along the chute E in order to limit the number of hairpins accumulating at a time upon the chute 60. It is desirable to hold some hairpins in reserve upon the chute E. Obviously the shaft 185 (Fig. 17) will rotate once during each cycle of operations required for the filling of the gatherer with hairpins; therefore the number of teeth on the ratchet 188 will equal the number of hairpins to be assembled in the gatherer. The shape of cam 189 is such that valve operating member 190 is all the way down for about ¼ revolution of shaft 185 and member 190 is all the way up for over ½ revolution. During about ¼ revolution the member 190 is moving down. Therefore, the hairpins on chute E will be prevented from descending to chute 60 during over ¼ of the cycle during which the gatherer is receiving hairpins from the magazine feed. Figs. 1 and 2 show that the hairpins on chute E are held back while about ¼ of the required full number of hairpins are received by the gatherer J. By that time the cam 189 has arrived in the position shown in Fig. 17, wherein its high land is about to leave the member 190. Then the hairpins on chute E will be released and they will slide down upon chute 60. Before the gatherer J has made one complete revolution, the cam 189 will have moved the member 190 down sufficiently to cause valve 191 to open to admit pressure fluid to cylinder 193 to cause finger 197 to move down again to prevent hairpins from sliding down chute E to chute 60. When the gatherer J is filled, it stops rotating and the magazine feed stops; and there is a gap between the lowest hairpin on chute E and the highest hairpin on chute 60. Therefore chute 60 of magazine F can be elevated above chute E after the gatherer J is filled without dislodging any hairpins since there are no hairpins located at the gap between these parts. The foregoing describes the normal operation. However, it might happen that the compressed air line to cylinder 192 might be shut off after the magazine F (Fig. 3) had been elevated above magazine E. In such case the finger 197 would be lifted and the hairpins on chute E would descend against the upper end of the chute of magazine F as shown in Fig. 3. No harm is done, however, since the hairpins will descend upon the chute of magazine F when it is lowered.

For each rotation of shaft 163 there will be a reciprocation of feed bar 97. As stated before, when the bar 97 is down, the lowermost hairpin on the chute 60 engages the slide, the legs $H_1$ and $H_2$ directly engaging the bar 97, and the yoke $H_3$ engaging the block 104. When the bar 97 is down, the screw 153a carried by the plate 153 will engage the lever 93 to cause its finger 92 to be moved slightly away from the yoke of the hairpin next to the lowest hairpin. When the bar 97 moves upwardly, the screw 153a will immediately release the lever 93 so that, by the action of the spring 96, it will engage the yoke of the hairpin next to the lowest hairpin. When the bar 97 and the block 104 have been moved entirely above the hairpin, as shown in Fig. 11, the lowest hairpin is free to move off the block 90 and then down between the block 90 and the plate 112. It is started in this movement by directing against it a blast of air issuing from two small holes 90a block 90. These holes are connected with a passage 90b and with a passage 90c connected in any suitable manner with a source of compressed air. Just as the bar 97 moves above the lowermost hairpin, the compressed air is admitted to the passage 105 and then issues from the holes 90a to start a hairpin in its movement toward the plates 99 and 112. Then the hairpin is free to gravitate downwardly. As it moves downwardly the lower ends of its legs will first be received by grooves 200 in the branches 201 of a notched plate 202 fastened to the pedestal 59. These grooves 200 guide the legs into the notches 131 provided by the block 120. As shown in Fig. 12, these notches 120 flare out to the top surface of the block as indicated by the surfaces 131a, 131b and 131c. Thus the legs of the hairpins are guided into the notches 131. When the bar 97 descends, the cam 107 carried thereby will engage the lever 109 to cause it to move counterclockwise, thereby causing the bar 117, the rods 116 and the block 120 to move from left to the right into the position shown in Figs. 13 and 15 thereby retracting the block 120 from the yoke of the supported hairpin thereby permitting the hairpin to gravitate from the magazine into the gatherer as shown in Fig. 4. If for any reason the hairpin does not gravitate from the block 90 it will be forced downwardly during the movement of the bar 97. As stated before, the downward movement of the bar 97 to clear the space through which a hairpin should normally gravitate is followed by an elevation of the finger 92 of the lever 93 so that the hairpin last retained by the finger 92 is released so it may gravitate down the block 90 and against the feed bar 97 when in the lower position. Following the upward movement of the bar 97 the cycle is again repeated as the released hairpin will then be free to gravitate between the block 90 and the plate 112 until it hangs upon the block 120. Then the block 120 is then retracted during downward movement of the bar 97 again so that this hairpin may descend into the gatherer.

Gatherer J

Upon the table C there are mounted two frames 210 each for supporting a gatherer J. Within the upturned tubular boss 211 of frame 210 there is journalled a sleeve 212 connected with the driven gear 213 of a Geneva gear movement (Figs. 21 and 19). Gear 213 is provided with notches 214 for receiving a driving pin 215 mounted on a crank disc 216 journalled in a bearing 217 provided by table 20. Disc 216 is connected with a shaft 218 carrying a sprocket gear wheel 219 connected by chain 220 with sprocket 177 (Fig. 16). The pitch diameter of sprockets 219 and 177 are equal to the pitch diameters of beveled gears 166 and 167 (Fig. 17). Therefore during each revolution of shaft 218 there will occur one indexing movement of the gear 213 and one reciprocation of the bar 97.

Shaft 218 is journalled in bearings 221 and 222 supported by frame Z. Upon the shaft 218 there is loosely mounted a driving gear 223 connected with a clutch member 224 adapted to drive a clutch member 225 connected with a sleeve 226 slidable along the shaft 218 and connected therewith by splines 227. Screws 228 fasten to the sleeve 226 a plate 229 having a recess for receiving a spring 230 enclosed also within a central bore in the shaft 218. The spring 230 normally urges the clutch element 225 away from element 224, downward movement of sleeve 226 being limited by a part 231 against which the plate 229 rests. Sleeve 226 is provided with an annular groove 232 for receiving rollers 233 mounted on screws 234 attached to the arms 235 of a bifurcated lever 236 (Fig. 33) connected with a shaft 237 supported by frame Z. Shaft 237 is connected with a lever 238 having a hard metal lug 239 adapted to be received by a notch in the disc 240 driven by a worm gear 242 meshing with the worm 243 driven by shaft 218. The gear ratio between worm 243 and 242 is such that for each revolution of the Geneva gear 213 (Fig. 21) there will be one complete rotation of the disc 240. Gear 223 is driven by gear 244 on shaft 245 journalled in bearings 246 and 247 provided by frame Z. Shaft 245 is connected by coupling 248 with shaft 249 carrying a pulley 250 for receiving a belt 251 driven by an electric motor, not shown. It is obvious that an upward movement of the part 231 will cause the clutch members 225 and 224 to be engaged so that the shaft 218 will be driven by the rotating pulley 250 through the gears 244 and 223 and the clutch. Rotation of shaft 218 will cause the disc 240 to move its notch out of alignment with the lug 239 of arm 238. In this way the clutches 224 and 225, are maintained in engagement due to the fact that the lug 239 will ride on the smooth periphery of the disc 240 until the end of the cycle when the notch in the disc 240 is brought again into alignment with the lug 239. Then the spring 230 causes the lug 239 to engage the notch of disc 242 and the clutch members to be disengaged, whereupon rotation of the shaft 218 ceases.

The clutch closing part 231 is operated by means forming a part of the control system of the machine which will be described later.

Referring again to Fig. 21, the rotatable sleeve 212 carries a plurality of keys 260 received in grooves 261 provided in an outer gatherer member or sleeve 262. Sleeve 262 is fixed at its lower end by screws 263 to a circular plate 264 which is journaled in a plate 265 connected by rods 266 with a cross-head 267 supported on the end of a piston rod 268 connected with a piston 269 in cylinder T (see Fig. 1). Disc 264 is retained within the recess in plate 265 by a retainer ring 270 attached to plate 265 by screws 271.

Disc 264 is apertured at 272 to receive rods 273 connected at their upper ends with an intermediate gatherer member or sleeve 274 and at their lower ends with a cross-head 275 provided with a bearing 276 within which is journalled a rod 277 retained by a nut 278. Rod 277 has an enlarged portion 277a extending through a step bearing 279 located between cross-bar 275 and flange 277b of rod 277. Rod 277 has a threaded portion 277c connected with a piston rod 280 connected with a piston 281 in cylinder S.

Plate 264 is connected by screws 282 with a sleeve 283. Disc 264 carries a retainer ring 284 for retaining a step bearing 285 which is located between a shoulder 286 on a stub shaft 287 having a portion extending through the step bearing 285 and a washer 288 retained by a screw 289 attached to stub shaft 287. Shaft 289 is welded at 290 to a sleeve 291 which is the inner gatherer member.

Referring to Fig. 22a it will be seen that the sleeve 274 has diametrically opposite helical slots 292 and that the sleeve 283 has diametrically opposite peripheral slots 293. A rod 294 passes diametrically through plain holes in sleeve 291, the slots 293 of sleeve 283 and the helical slots 292 of sleeve 274. It is therefore apparent that, when the sleeve 274 or intermediate gatherer member is moved upwardly by piston rod 280 of cylinder S, the sleeve 291 or inner gatherer member will be rotated relative to sleeves 283 and 274.

A block 300 is mounted upon the upper end of sleeve 291 and is secured thereto by screw 301.

Passages 302 and 303 are provided for the purpose of admitting oil to the interior of sleeve 291 which serves as an oil reservoir from which oil passes through side passages 304 to lubricate parts of the mechanism. Block 300 is provided with an exterior annular flange 305 and with an annular row of radially extending notches 306 which are cut through the flange 305 and into the body of the block 300 (Figs. 21, 24 and 29). Around the body of the block 300 is press-fitted a metal band 307 which divides the groove 306 into recesses 308 and 309. The annular row of recesses 308 receive the inner annular row of hairpin legs, and conforms to the locations of the inner portions of the core slots that are to receive these legs. It is apparent that the annular row of recesses 309 are intended to receive the outer annular row of hairpin legs. However, the outer annular row of hairpin legs are not initially placed in the row of recesses 309 as the hairpins descend from the magazine G to the gatherer J.

At its upper end portion, the sleeve 262 or outer gatherer members is provided with a thickened wall 262a provided with an annular row of longitudinally extending grooves 310, each beveled at its upper end 311. The block 300 of the inner gatherer member 291 is beveled as indicated at 308a around the upper end of each of the recesses 308. Initially the leg H—1 of each hairpin H drops into one of the recesses 308 and the leg H—2 drops into one of the recess 310. The entrance of the legs into these recesses is facilitated by the beveling 308a around the recess 308 and the beveling 311 around the recess 310.

The hairpins H descend until the legs H—1 rest upon the upper end portion 274a of sleeve 274 or intermediate gatherer member which is so dimensioned as to provide a sliding fit with the thickened portion 262a of outer gatherer member 262 as well as the sliding fit with the inner gatherer member 291. This portion 274a merges into an annular flange 274b, which is provided with an annular row of grooves 312, each in alignment with recess 310 of sleeve 262. Since there is no relative rotation between sleeve 262 and sleeve 274 the recesses 310 always remain in alignment with the grooves 312.

The operations of the feed G of magazine F and the gatherer J are so timed that during the up-stroke of the gatherer 97 the gatherer sleeves 262, 274, 283 and 291 are all rotated through the Geneva gear movement through an angular distance equal to the angular spacing of the armature core slots. While the gatherer is at rest, the magazine feed G causes a hairpin to drop into the gatherer as shown in Fig. 4. These operations are repeated until all of the recesses 310 and 308 of the gatherer are filled, as shown in Fig. 24. Then the cycle of discharging hairpins from the magazine and of rotating the gatherer to receive these hairpins in an annular row is completed; and the clutch members 225 and 224 are then disconnected automatically in a manner to be described more fully later. Then pressure fluid is admitted to the lower end of cylinder S to cause piston rod 288 to rise and thus move the sleeve 274 or intermediate gatherer member from the position shown in Fig. 21 to that shown in Fig. 22. This causes the hairpins H to be elevated from the position shown in Fig. 21 to that shown in Fig. 22. While the hairpins are thus being elevated, their legs H2 which are in the outer annular row, are caused to move from the recesses 310 of sleeve 262 through the grooves 312 of sleeve 274 and into the recess 308 of the block 300. This movement of the outer legs H2 is effected by rotation of the block 300 relative to the grooved flange 274b of the sleeve 274 and to the outer sleeve 262. This relative rotation of block 300 takes place due to the fact that elevation of the intermediate sleeve 274 causes the inner sleeve 291 to rotate relative to the other sleeves. In this way the outer legs H2 of the hairpins H which were received initially in the outer row of recesses 310 of outer sleeve 262 are gathered in toward the center until they are received by recesses 309 of block 300 of the inner sleeve 291. The hairpins are now positioned so that they can be passed simultaneously longitudinally through the armature core slots when the group of hairpins positioned as shown in Figs. 22 and 27 is moved bodily into alignment with the armature core. As shown in Fig. 6, the armature core ac is located in a receptacle 374 associated with the assembling apparatus R. In order to move the group of hairpins gathered in as shown in Figs. 5 and 22 from the gatherer J to the assembler QR, a transfer head K is provided.

*Transfer head K*

Referring to Fig. 39, the frame O is provided with ears 320 supporting roller bearings 321 rotatably supporting a shaft 322 to which an arm 323 is fixed. The arm 323 supports the transfer head K which is in the form of a plate 324 integral with the arm 323. Plate 324 is provided with a central recess 325 which receives a block 326 centrally apertured to receive gatherer sleeve 262 and is provided with a plurality of keys 327 received by the grooves 261 in sleeve 262. When the sleeve 262 is in the upper position shown in Figs. 21 and 22, it is keyed to the block 326 so that, when the sleeve 262 is indexed by the Geneva gear movement, the block 326 rotates with it. The block 326 is provided with an upstanding annular flange 328 which is provided with radially extending grooves 329 each for receiving a bar 330 carrying a pin 331 received by a scroll slot 332 in a scroll plate 333 which is mounted upon the frame 324 and is rotatably supported thereby by means of a retainer ring 334 secured by a screw 335. A cover plate 337 (Fig. 5) covers the scroll slots in the scroll plate 333. The plate 333 is operated by handle 337 attached by screws 338 which extend through the cover plate 336 and into the scroll plate 333. Since the plate 333 is operatively connected to the block 326 through the sliding bars 330, it is apparent that rotation of sleeve 262 causes rotation of the scroll plate 333, hence the handle 337. When the magazine F is in the lower position there is sufficient clearance as shown in Fig. 1 between magazine and plate N to provide for the passage of handle 337 between these parts as the gatherer head sleeve 262 is rotated.

Each sliding bar 330, shown in the retracted position in Fig. 29, is provided with notches 340 on opposite sides thereof. Therefore, each pair of adjacent bars 330 will provide a pair of adjacent notches 340. Each pair of adjacent notches 340, as shown in Fig. 29, will be in vertical alignment with a recess 310 of sleeve 262. Therefore each hairpin leg H2 will drop down between adjacent notches 340 as it descends into a notch 310. The inner end of each bar 330 is provided with a saw cut 341 extending into a hole 342 thus providing resilient fingers 343. After the hairpins have been gathered as shown in Fig. 22, the operator grasps the handle 337 and rotates the scroll plate 333 clockwise, thereby causing the bars 330 to move from the positions shown in Fig. 29 to those shown in Fig. 27, thereby causing each pair of radially disposed hairpin legs H2 and H1 to be resiliently clamped between adjacent resilient fingers 343 of adjacent bars 330.

When the bars 330 are located as shown in Fig. 28 the group of hairpins will be retained by the transfer head K independently of the gatherer J. Before the transfer head K can be moved from the position in alignment with the gatherer J into a position in alignment with the assembler QR, the gatherer J must be lowered below the transfer head K. This is accomplished by admitting pressure fluid to the upper end of cylinder T (Fig. 1) thereby causing the cross head 267 (Fig. 21) to move downwardly and the plate 265 to move from the position shown in Fig. 22 to that shown in Fig. 23. The transfer head frame 324 is therefore free of connection with the gatherer J and can be moved from the position shown in Fig. 23 to that shown in Figs. 29 and 40 in alignment with the assembler QR.

Referring to Fig. 25, the sleeve 262 is provided with a wall portion which normally retains a plunger 350 in the position shown. Plunger 350 is slidable through block 326 and has a head 351 engaging a plunger 352 at a line of contact which is flush with the outer surface of the block 326 and the inner surface of the block 324. The plunger 352 is urged against the rod 350 by a spring 353 retained by plug 354. So long as the sleeve 262 is in the upper position the block 326 is free to rotate relative to the frame 324. But when the sleeve 262 is moved downwardly to the position shown in Fig. 23, it brings an inclined surface 355 adjacent to the end of the plunger 350 thereby permitting the spring 352 to move the plunger 353 within a sleeve 356 carried by the block 326. This then causes the block 326 to be locked to the frame 324 so that it cannot rotate relative thereto during the time that the gatherer J is not received within the transfer head K.

*Assembler QR*

The pedestal P as shown in Fig. 1, supports a cylinder V within which is located a piston connected with a piston rod 360 (Fig. 40), connected with a plunger 361 to which a screw 362 attaches a block 363 connected by a screw 364 with a cam plate 365 slidable in a groove 366. The plunger 361 carries a block 366 retained by a screw 367. The lower portion of block 366 is provided with an annular groove 368 of such shape as to engage the hairpin yokes H3 as shown in Fig. 41. Block 366 and plunger 361 are provided with aligned apertures 369 and 370 for receiving the upper end of an armature shaft as extending through an armature core ac which is received within a block 371 supported by a block 372 attached to a plunger 373 slidable in a sleeve 374 attached to the table C. The plunger 373 is attached at its lower end by a turnbuckle 375 to a piston rod 376 attached to a piston within the cylinder U (Fig. 1). The plunger 373 is slidably connected with sleeve 374 by a key 378 so that the plunger 373 is nonrotatable. Block 372 is provided with a recess 379 for receiving the lower end of the armature shaft as and with a plurality of grooves 380 for venting the space between block 379 and the sleeve 371. The armature core ac is nonrotatably supported by the sleeve 371 since a key 381 carried by the sleeve 371 is spring urged by a spring 382 into a core slot; thereby locating the core so that it will receive the legs of the group of hair pins aligned with the core.

After the transfer head K carrying a group of hair-pins has been moved from the position shown in Fig. 5 to that shown in Figs. 6 and 40, pressure fluid is admitted to the lower end of cylinder U thereby causing the plunger 373 to move upwardly from the position shown in Fig. 40 to the position shown in Fig. 41. Plunger 373 moves upwardly a distance sufficient to cause the upper end of the core ac to be moved above the lower ends of the hairpins H. In other words, upward movement of the plunger 373 causing the lower ends of the hairpin legs to be entered into the core slots. After the plunger 373 has arrived in the position shown in Fig. 41, pressure fluid is admitted to the upper end of cylinder V to cause the plunger 361 to move downwardly from the position in Fig. 40 to that shown in Fig. 41, thereby causing the block 366 to engage the upper ends of the hair pins and move them from the position shown in Fig. 40 to that shown in Fig. 41 to complete the assembly operation. During the downward movement of the plunger 361 the clamping bars 330 of the transfer head K are retracted automatically. This is effected by the engagement of cam 365 carried by plunger 361 with roller 390 mounted on the left end of a rod 391 slidable in bearings 392 provided by pedestal P. The right end of rod 391 is provided with a slot 393 to receive the upper end of the lever 394 pivoted on a rod 395 carried by a bracket 396 attached to pedestal P. Lever 394 is connected with a slide 397 supported between the bracket 396 and the retainer plate 398 attached to bracket 396. Slide 397 is provided with a spear head thus providing camming surfaces 398 and 399. During movement of slide 397 from right toward left in Fig. 40 or left to the right in Fig. 29, a roller 400 attached to scroll plate 333 is moved into the position 400a (Fig. 29) thereby rotating the scroll plate 333 counter-clockwise thereby causing the bars 330 to be retracted. The retraction of the bars 330 takes place after the hair pin legs have been entered into the armature core slots. Therefore the resilient fingers 343 may be retracted from engagement with the hairpin legs so that the hairpin legs can be finally assembled with the core as shown in Fig. 41. Fig. 29 shows the fingers 343 retracted from the legs and it also shows four of the hairpins after having been assembled with the armature core ac.

After the assembler parts Q and R have been moved into the position shown in Figs. 7 and 41, pressure fluid is admitted to the top end of cylinder U and the bottom end of cylinder V to cause the parts Q and R to return respectively to upper and lower positions shown in Figs. 40 and 8. Spring 397a (Fig. 41) returns the plate 397 and the rod 391 to the positions shown in Fig. 40. The transfer head K is returned to its former position in alignment with the right hand gatherer J. Then the operator removes the assembled armature aa and places it upon a conveyor or in a suitable container. Fig. 6 shows an assembled armature aa lying upon the table C.

While the operation of completing the assembly of an armature core with a group of hairpins in the right hand transfer head K has taken place, other hairpins are being assembled in the left hand gatherer J preparatory to being gathered and then clamped into the left hand transfer head K.

With respect to the right hand transfer head Kr (Fig. 38) the rotation of the scroll plate handle 337r by the right hand gatherer is clockwise during the indexing of the gatherer. At the end of indexing of the right hand gatherer, handle 337r extends toward the right as shown in Fig. 5. The operator, who stands in front of the machine, as viewed in Fig. 1, grasps the control lever 406r (Fig. 1) by his right hand and pushes it down and grasps the handle 337r by his left hand and pulls this handle toward him thereby causing the scroll plate 333 to be rotated clockwise to cause the bars 330 to clamp the gathered hair pins to the transfer head Kr. By continuing to pull the handle 337r, the transfer head Kr is caused to move into alignment with the assembler QR. Handle 406r will be held down by a latch which is released when head Kr is moved away from the right hand gatherer.

With respect to the left hand transfer head Kl (Fig. 38) the rotation of the scroll plate handle 337l by the left hand gatherer is counterclockwise during indexing of this gatherer. At the end of the indexing of the left hand gatherer, control lever 406l (Fig. 1) is grasped by the left hand and is pushed down and handle 337l of the transfer head Kl, which then extends toward the left, is grasped by the right hand. While holding lever 406l down, the operator pulls this handle 337l toward him, thereby causing the scroll plate of the head Kl to be rotated counterclockwise. This causes the left hand group of hairpins to be clamped by bars 330 to the left hand transfer head Kl. By continuing to pull the handle 337l the transfer head Kl toward him, the operator causes the head to move into alignment with the assembler QR. Handle 406l will be held down by a latch which is released when head Kl is moved away from the left hand gatherer.

When the spear head bar 397 is advanced toward the assembler QR if head Kr is then aligned with QR, surface 398 will engage roller 400 of that head to cause its scroll plate 333 to move counterclockwise. If head Kl is then aligned with QR, surface 399 will engage the roller 400 of head Kl to cause its scroll plate 333 to move clockwise. Thus the spear head 397 operates upon the scroll plate of either transfer head to retract the clamping bars thereof.

*Controls and interlocks*

As shown in Figs. 9 and 24 the frame 324 of transfer head K is recessed to receive a bushing 401 which receives a plunger 402 connected by pin 403 with a lever 404 pivoted at 405 (Fig. 42) and connected with a hand lever 406 (see also Fig. 1). A spring 407 urges the lever 406 to upper position in order to urge the plunger 402 into the socket 401. Plunger 402 is slotted to receive an arm of a bell crank lever 408 pivoted at 409 on frame N and connected as shown in Fig. 42 with valve No. 1. As long as the plunger is received by the bushing 401, the transfer head K cannot be moved out of alignment with the gatherer J. Lifting the hand lever 406 retracts the plunger 402 and also operates the valve No. 1. Then the transfer head K can be moved away from the gatherer J and into alignment with the assembler QR. As the head K is moved away from the frame N while the hand lever 406 is held to cause the upper end of the plunger to be slightly below the surface 409 of bracket 410, a latch 411 slidably horizontally in bracket 410 is urged by spring 412 toward the left so that it moves in this direction and covers the upper end of plunger 402 thus retaining the plunger 402 and the valve No. 1 in a certain position until the frame 324 of head K is moved back again to move the latch 411 to the position shown in Fig. 9. Movement of latch 411 toward the left is limited by a pin 413 carried by the latch and movable within a slot 414 provided by the bracket 410.

Frame 324 is provided with a second bushing 415 (Fig. 24) which, when the frame 324 is moved into alignment with assembler QR as shown in Fig. 40, is brought into alignment with a plunger 416 slidable in brackets 417 and 418. Before the frame 324 is swung into alignment with assembler QR, the upper end of rod 416 is covered by a latch bar 419 which slides in a frame 417 and which is urged toward the left by a spring 420, this movement being limited by a pin 421 carried by the bar 419 and slidable within a slot 422. This bar 419 retains the rod 416 in a lower position than that shown in Fig. 42. Rod 416 is connected by an arm 423 with a rod 424 connected with a foot pedal 425 pivoted at 426. A spring 427 urges the rod 424 upwardly thus urging the rod 416 against the latch plate 419 when the latter covers it. Therefore, when the frame 324 of head K is moved into alignment with the assembler QR, it will engage the latch bar 419 and move it into the position shown in Fig. 40, thus retracting it from the upper end of the rod 419. Since the socket 415 of head K is brought into alignment with the rod 416, the rod will be moved by the spring 427 into the socket 415 thus latching the frame 324 in position in alignment with assembler QR. The rod 416 controls valve No. 3 indicated in the control diagram, Fig. 42.

Valve No. 2 indicated near the middle of Fig. 42 and shown in Figs. 34 to 37, is mounted upon frame Z and is provided with operating plunger 430 which is spring pressed upwardly so that a roller 431 carried by member 430 engages the camming lobe 432 of a disc 433 pinned at 434 on a shaft 435. Shaft 435 is journalled within bearing sleeve 436 which is pressed into tubular bosses 437 and 438 integral with frame Z. Bearing sleeve 436 supports the worm wheel 242 driven by worm 243 and driving the disc 240 having the notch engaged by the lug 239 of lever 238. The disc 240 carries a pin 440 received by an arcuate slot 441 in a disc 442 connected by pin 443 with shaft 435. During the operation of the gathering head J the disc 240 rotates clockwise as viewed in Fig. 35. The pin 440 bears against the front end of the slot 441 of disc 442 and rotates the latter clockwise finally causing the cam projection 432 to engage roller 431 on valve control rod 430 to cause valve No. 2 to be moved into a certain position. At the same time the lug 239 of arm 238 drops into the notch of disc 240; and the clutch 224, 225 is disengaged and the operation of feeding and gathering hairpins ceases. At this time, the gathering head is in the upper position shown in Fig. 22. One of the gathering head rods 266 carries a clamp bracket 445 fixed thereto in the desired position of adjustment by screws 446. Bracket 445 carries a pivot pin 447 supporting a finger 448 which will occupy the position shown in Fig. 34 at the end of the operation of loading the gathering head with hairpins. At this time, a pin 449 carried by a disc 442 bears against the finger 448 and urges it counterclockwise against the action of a spring pressed plunger 450 carried by bracket 445. By means to be described the gatherer J is dropped in order that the transfer head K may be moved into alignment with assembler QR. As the gatherer J drops the rod 266 will move into the position shown in Fig. 35, and the finger 448 will be moved by the spring plunger 450 into a position under the pin 449. After the transfer head K has been returned to alignment with the gatherer J, the gatherer J is moved upwardly within the transfer head K. During this movement, the rod 266 moves up and the finger 448 pushes the pin 449 clockwise thus causing the disc 442 to rotate ahead of the disc 240 thereby causing the cam lobe 432 to be moved into the position Fig. 42 thereby permitting a spring in valve #2 to move the control rod 430 of valve #2 to its upper position.

The clutch 224, 225 is closed and the stop lug 239 is disengaged from the disc 240 through the action of a solenoid 452 having an armature connected by a rod 453 (Fig. 30) with a lever 454 pivoted at 455 on frame Z. Lever 454 carries the part 231 for imparting upward movement to the clutch operating sleeve 226.

Referring to Fig. 42 a motor driven pump 460 forces oil from a reservoir 461 and discharges through pipe 462 into a pipe 463 which feeds No. 1 valve, and into a pipe 464 which feeds No. 2 valve, and into a pipe 465 which feeds No. 3 valve. Pipes 466 and 467 provide a return or exhaust from valves No. 1 and No. 2 to the reservoir 461. Pipe 468 provides an exhaust and return from the valve No. 3 to the reservoir 461. Valve No. 1 is so constructed that when its operating rod 408a is in the left hand position as shown in Fig. 42 feed pipe 463 will be connected with pipe 470 leading to the lower end of cylinder T. When valve 408a is in the right hand position feed pipe 463 will be connected with pipe 471 leading to the upper end of cylinder T. The piston within cylinder T elevates and lowers the gatherer J.

When pipe 470 is connected with feed pipe 463 to cause pressure fluid to flow into the lower end of cylinder T to elevate the gatherer J, the pipe 471 is connected with return pipe 466. When pipe 471 is connected with feed pipe 463 to cause pressure fluid to flow into the upper end of cylinder T to lower the gatherer J, pipe 470 is connected with return pipe 466.

When rod 430 of valve No. 2 is in the upper position shown in Fig. 42, pressure fluid is caused to flow from pipe 464 to pipe 472 leading to the upper end of cylinder W to cause the magazine F to move down into operating position. Pressure fluid is also admitted through pipe 473 to the upper end of cylinder S to cause the spiraler (intermediate gatherer member 271) to return to normal or down position with respect to other elements of gatherer J as the pistons in cylinders W and S move downwardly. The fluid exhausted from below the pistons of these cylinders returns to reservoir 461 through pipes 474 and 475, valve 476 and pipe 477 and pipe 467.

When the lobe 432 of disc 433 engages the roller of rod 430 as shown in Fig. 34 thus causing rod 430 to move downwardly, the feed pipe 464 is connected with pipe 477. Valve 476 causes pressure fluid to be admitted immediately to pipe 474 to cause the piston in cylinder W to move up and thus elevate the magazine F. After the magazine F moves upwardly, the valve 476 automatically opens a port to branch pipe 475 to cause the piston in cylinder S to move upwardly and thus causes the intermediate gatherer member 274 to rise to elevate the hairpins while causing the inner gatherer member 291 to move the hairpins into the position shown in Fig. 5. As the pistons in cylinders W and S move upwardly the fluid pressure above these pistons is discharged back to the reservoir 461 through the pipes 473, 472 and 467.

The solenoid 452 is connected by wires 480 and 481 and pairs of contacts 482 and 483 with current source line wires 484 and 485. Contacts 482 and 483 are part of a time lag relay having a magnet coil 482a connected with wires 484 and 485 through a second time lag relay having contacts 486 and a magnet coil 487. Coil 487 is connected with wires 484 and 485 through switches 488 and 489 in series. When the piston rod 54 of cylinder W has moved upwardly, switch 489 is open. During a part of the downward movement of rod 54 to move the magazine F into operating position, the switch is closed. For this purpose a plate 490, carried by the magazine F as shown in Fig. 2, engages the controller 489a of switch 489. When the head lever 406 is moved upwardly in Fig. 42 in response to the upward movement of plunger 402 into the recess 401 of frame 324 of transfer head K, a plate 491 on lever 406 engages operating member 483a of switch 483 to close the same.

During the period when both switches 488 and 489 are closed, the solenoid 452 is energized to close the clutch and the indexing of the gatherer and the operation of the magazine feed begins. Due to the time lag of the two relays mentioned, the solenoid is not energized instantly, but by the time that the magazine has fully descended, then switch 489 has opened; but the time delay in opening of the relays is sufficient for rotation of disc 240 to have cammed lever 238 into clutch retaining position before contacts 482 and 483 separate and solenoid 452 is deenergized.

*Mode of operation of the control*

Fig. 42 shows diagrammatically the controls for the assembler QR and for the right hand group of units comprising a magazine F, a gatherer J and a transfer head K. As the left hand set of corresponding units is controlled in a manner identical to the right hand set of units, only the control of right hand set of units with regard to the assembler QR will be described.

Assume that the right hand transfer head K has been emptied and has been returned to alignment with right hand gatherer J as shown in Fig. 8, at the instant of its return, the latch 411 will be pushed out of alignment with the rod 402 thus causing the same to be elevated by the spring 407 acting through hand lever 406 and lever 404. This will cause the bell crank lever 408 to rotate clockwise to the position shown in the Fig. 42 thereby causing member 408a controlling valve No. 1 to move toward the left, thereby causing feed pipe 463 to be connected with pipe 470 thereby causing the piston in cylinder T to move upwardly and to elevate the gatherer J so that it is located in operating position within transfer head K as indicated in the diagram. As hand lever 406 moves up it causes the closing of switch 488, but solenoid 452 is not yet energized, because switch 489 is open for the reason that, at this time, the piston rod 54 is up to hold the magazine F in upper, non-operating position. During upward movement of gatherer J the finger 448 carried by left hand rod 266 operates in the manner indicated by arrow 448a to engage the pin 449 on disc 442 to rotate the latter clockwise in order to move cam lobe 432 of disc 433 away from the roller 431 so as to permit rod 430 of valve No. 2 to move from a lower position (occupied just previously) to the upper position shown in Fig. 42. This movement of the valve No. 2 will cause pressure fluid to be admitted through the pipes 472 and 473 to cause the magazine F to move downwardly and to cause the piston in cylinder S to move downwardly to rotate the inner gatherer member 291 to normal position by lowering the intermediate sleeve 274 thus bringing all parts of the gatherer J into condition for receiving hairpins. As the piston rod 54 moves downwardly to move the magazine F downwardly, the switch 489 is closed momentarily and the solenoid 452 is energized to cause the clutch parts 224, 225 to engage thereby effecting rotation of shaft 218 and the intermittent rotation of Geneva driven gear 213 and also the rotation of the shafts 174, 171 and 168 which effect reciprocation of the magazine feed bar 97. Downward movements of the bar 97 accompanied by discharge of hairpins from the magazine to the gatherer, alternating with intermittent rotary movements of the gatherer, continue until all of the hairpin leg receiving recesses of the gatherer have been filled. As stated heretofore the closing of switch 489 during downward movement of magazine F was only of such duration as to energize the solenoid 452 long enough to start rotation of shaft 218 and to cause the stop lug 239 to be cammed out of the notch in disc 240. During the greater portion of the time of one cycle of gatherer indexing and hairpin discharging operations, the switch 489 is open. Since the solenoid 452 is not energized at the time the disc 240 has made one revolution to bring its notch back into alignment with the stop lug 239, the spring 230 (Fig. 21) urges the sleeve 226 downwardly to open the clutch and cause the stop lock 239 to engage the notch in the disc 240. Thus the gatherer indexer and the magazine feed stop at the end of the operation of filling the gatherer. At this instant the lobe 432 of cam disc 433 has engaged the roller 431 of rod 430 to cause the same to move downwardly thereby causing valve No. 2 to connect feed pipe 464 with pipes 477 and 474 to cause the piston 55 in cylinder W to move upwardly to move the magazine F into upper position shown in Fig. 5. After that occurs, pressure builds up in the line 477 sufficiently to cause valve 476 to open a port connected with pipe 475, whereupon the piston in cylinder S rises to cause intermediate sleeve 274 to rise thus moving the hairpins upwardly while causing inner sleeve 291 to rotate to gather the hairpins into the position shown in Fig. 5.

The operator then grasps the handle lever 406 to move the same downwardly as viewed in Figs. 1 or 42 thereby retracting pin 402 from bushing 401 in the frame 324 of transfer head K. This movement of lever 406 allows the switch lever 488a to move downwardly to open the switch 488 thereby opening the circuit of solenoid 452, opened also at switch 489. Downward movement of hand lever 406 causes rod 408a of valve No. 1 to move toward the right from the position shown in Fig. 42 to cause the pipe 463 to be connected with pipe 471 thereby causing the piston in cylinder T to move downwardly to move the entire gathering head J downwardly. While the operator holds the hand lever 406 downwardly he clamps the gathered group of hairpins to the transfer head K and moves the transfer head K from the position shown in full lines in Fig. 42 to the dot dash line position K′ in alignment with the assembler QR. While the hand lever 406 is held downwardly and the transfer head K is thus moved, the latch plate 411 is pushed by a spring 412 over the top of rod 402 thus locking the valve No. 1 in the last mentioned position.

As transfer head arrives in the position K′ it engages plate 419 which, up to this time, has been holding rod 416 down and moves latch 419 into the position shown in Fig. 40. At the same time, the bushing 415 is brought into alignment with rod 416 and rod 416 is urged upwardly by spring 427 so that the transfer head K is locked in alignment with assembler QR. As rod 416 moves upwardly, it permits rod 490 of valve No. 3 to move upwardly under spring pressure to such position as will cause feed pipe 465 to be connected with pipe 491, valve 492 and pipe 493. Pressure fluid will be admitted immediately to the bottom of cylinder U to cause assembling element R to be elevated into the position shown in Fig. 41. After this movement of R has taken place, pressure in valve 492 builds up sufficiently to cause the valve 492 to place pipe 491 in communication with pipe 494 whereupon the piston in cylinder V moves downwardly to carry assembly element Q into the position shown in Fig. 41.

Next, the operator presses the pedal 425 for the purpose of moving rod 416 down below the level of the transfer head at K′ and below the latch plate 419 and to move valve rod 490 to cause valve No. 3 to such condition that feed pipe 465 is connected with pipe 495, valve 496 and pipe 497. Pressure fluid is admitted immediately to the lower end of cylinder V to cause assembling unit Q to be elevated. Then pressure builds up in valve 496 sufficiently to cause valve 496 to connect pipe 495 with the upper end of cylinder U; and assembling apparatus R moves downwardly and moves the work into the position shown in Fig. 8. While the operator still retains pedal 425 down he returns the transfer head to the position K in alignment with the gatherer J as shown in full lines in Fig. 8. Thus the cycle of operations is completed and will be resumed automatically in response to movement of transfer head K into the full line position shown in Fig. 42 (also Fig. 8) because such movement causes slide 411 to be retracted so that pin 402 may be elevated by spring 407 in order that the cycle of operations preceded by the raising of the gathering head J and the lowering of the magazine F may be repeated.

*Electric eye control of hairpin forming press*

Referring to Figs. 1, 2 and 20a, it will be seen that the hairpin forming press HP is provided with a chute 500 down which hairpins H slide with their yokes foremost. As each hairpin is discharged from the lower end of the chute 500 it is engaged by a pin 73 of conveyor D which discharges hairpins upon the chute E which discharges the hairpins downwardly to the magazine F. Chute E is provided with an opening or window 501 thru which rays from a lamp 502 are projected toward a photoelectric cell 503 connected with a line wire 504 and with a relay magnet coil 506 connected with line wire 505. A switch 507 controls the connection of lamp 502 with wires 504 and 505. Coil 506 is a part of a relay 510 having an armature 511 carrying contacts 512 and 513 engageable respectively with contacts 514 and 515. Spring 516 urges armature 511 counterclockwise so that contacts 512 and 514 are engaged.

A valve controlling solenoid 520 comprises a coil 521 connected with contact 514 and with a stationary contact 522 engageable with a movable contact 523 carried by a spring blade 524 having its fixed end connected by wire 525 with line wire 504 and having its free end engageable with a bar 526 attached to a solenoid armature 527. A valve controlling solenoid 530 comprising magnet coil 531 connected with contact 515 and with a contact 532 engageable with a contact 533 carried by a spring blade 534 having its fixed end connected by wire 535 with wire 525, and having its free end engageable with a bar 536 carried by a solenoid armature 537.

A fluid pressure controlling valve 540 has an operating rod 541 connected with the solenoid armatures 526 and 536. Valve 546 controls the communication between an inlet pipe 542 and outlet pipes 543 and 544 leading, respectively, to the upper and lower portions of a cylinder 545 cooperating with a piston 546 connected by rod 547 with a bell crank lever 548 pivoted at 549 and connected by rod 550 with a lever 551 for controlling a clutch 552 of the hairpin forming press HP.

When the accumulation of hairpins on chute E, Fig. 2, is not sufficient to block the window 502 the light from the lamp 502 will strike the cell 503 and render it electrically conductive so that the coil 506 of relay 510 will be energized. Armature 511 will be attracted to cause contacts 513 to engage contacts 515 thereby connecting solenoid coil 531 with a current source. Then solenoid armature 537 will be attracted toward the left to cause rod 541 to move toward the left thereby interrupting communication between pipe 542 and pipe 543 and venting the latter and thereby connecting pipe 542 with pipe 544. Then the piston 546 is elevated to cause clutch lever 541 to move toward the right to cause clutch 552 to connect the press HP with an operating shaft. Then the hairpin press operates to form hairpins and discharge them down the chute 500.

When the accumulation of hairpins upon chute E is such that the window 502 is blocked, the coil 506 of relay 510 is deenergized and spring 516 returns armature 511 to the position shown in Fig. 20a thereby rendering solenoid coil 521 operative to attract the solenoid armature 527 toward the right into the position shown thereby moving rod 541 to the right in order to cut off communication between the pipes 542 and 544 and to vent the latter and in order to establish communication between pipes 542 and 543. Then the piston 546 descends into the position shown in Fig. 20a, and causes the clutch 552 to disconnect the press HP from the operating shaft.

When the solenoid coil 531 has performed its function of attracting armature 537 toward the left, the circuit of coil 531 is open at contacts 533 and 532 due to the engagement of bar 536 with switch blade 534. Similarly, when coil 521 has performed its function of attracting armature 527 toward the right the circuit of coil 521 is broken at contacts 522 and 523, as shown in Fig. 20a, due to the engagement of bar 526 with switch blade 524. In this way the coils 521 and 531 do not carry current any longer than is necessary for the functioning of the control system.

As stated previously, the conveyor D is operated by motor 81 (Fig. 1). It is not necessary to provide for any automatic control of this motor because the chute E has a capacity sufficient for receiving all of the hairpins which have accumulated upon chute 500 and conveyor D at the time the press HP is caused to stop due to the blocking of the window 501.

In addition to the manual control of the circuit of the lamp 502, the Nichols and Fausset application No. 376,676, filed Jan. 30, 1941, discloses an automatic control coordinated with the means which feeds wire to the hairpin forming press. This automatic control may function in such manner that the lamp 502 will not burn when the supply of wire to the press has been exhausted. Therefore, regardless of whether the window 501 is blocked with hairpins or is open, the press HP will not operate after all of the wire has been unwound from the supply reel.

While the embodiments of the present invention as herein disclosed, constitutes a preferred form, it is to be understood that other forms might be adopted, all coming within the scope of the claims which follow.

What is claimed is as follows:

1. A machine for assembling hair pins in a predetermined order for subsequent assembly with a slotted core comprising a magazine having feed means for causing hair pins to discharge singly with their legs foremost, and a gatherer having concentric inner and outer members, the inner member having concentric rows of leg receiving recesses so disposed that the legs, when in said recesses, will be located in correct positions for entry into the slots of a core, the outer member having leg receiving recesses remote from the inner member, means supporting the magazine and movably supporting gatherer in such relation that, when a hair pin moves from the magazine into the gatherer, one leg will be received by a recess of the inner row of recesses of the inner member and the other leg will be received by a recess of the outer member, means for indexing the gatherer to present one recess after another of the inner member and the outer member to the magazine feed to receive a hair pin leg and for operating the magazine feed in timed relation so that a hair pin is discharged into the gatherer while it is stationary, means for effecting relative rotation between inner and outer members in order to cause the legs in the recesses of the outer member to move into the outer row of recesses of the inner member whereby the hair pin yokes are nested one within the other and means for guiding the hair pin legs during said movement.

2. A machine according to claim 1 having also means operating automatically after a predetermined number of feeding and indexing operations sufficient to fill the gatherer for causing the gatherer-indexer and magazine feed to stop and for concurrently causing operation of the means for effecting relative rotation between the inner and outer members in order to effect the hairpin-nesting operation of the gatherer.

3. A machine according to claim 1 having also means for connecting the outer member with the gatherer-indexer so that, when the indexer is stationary, the outer member cannot rotate, and having means rotatably supporting the inner member so that it may be rotated by the means which effects relative rotation between the inner and outer members.

4. A machine according to claim 1 having also means for connecting the outer member with the gatherer-indexer so that, when the indexer is stationary, the outer member cannot rotate, and having means for connecting the inner and outer members so that the indexer will rotate the inner member, said connecting means including a part which is adjustable longitudinally of said members to effect rotation of the inner member relative to the outer member, said connecting means forming a part of the means for effecting relative rotation between said members.

5. A machine according to claim 1 having also means operating concurrently with the operation of the means which effect relative rotation between the inner and outer members for causing the hairpins to move longitudinally toward the magazine, means for moving the magazine away from the gatherer, and a control system which initiates the functioning of the magazine-moving means and thereafter the functioning of the means for effecting relative rotation between the inner and outer members and the functioning of the means for moving the hairpins longitudinally toward the magazine.

6. A machine according to claim 1 having also means operating concurrently with the operation of the means which effects relative rotation between the inner and outer members for causing the hairpins to move longitudinally toward the magazine, means for moving the magazine away from the gatherer, and a control system operating automatically in response to the completion of a predetermined number of feed and indexing operations for causing the feed and indexer to stop and then causing operation of the magazine moving means to move the magazine away from the gatherer and then initiating concurrent operation of the means which effects relative rotation between the gatherer inner and outer members and of the means which moves the hair pins longitudinally toward the magazine.

7. A machine according to claim 1 having also an intermediate member located between the inner and the outer members and having provisions for receiving the ends of hair pin legs and for guiding the hair pin legs during the movement thereof from the outer to the inner members, and means for moving said intermediate member longitudinally and provided by the means which effects relative rotation between the inner and outer members.

8. A machine according to claim 1 in which the means which effects relative rotation between the inner and the outer member comprises an intermediate member located between the inner and the outer members, a longitudinal spline connection between the outer and intermediate members, a helical-spline connection between the intermediate and inner members, and means for moving the intermediate member longitudinally, said intermediate member having provisions for receiving the ends of hair pin legs and for guiding the hair pin legs during the movement thereof from the outer to the inner members.

9. A machine for assembling hair pins in an annular series, spaced in a predetermined relation preparatory to assembly with a slotted core comprising a magazine having feed means for causing hair pins to discharge singly with their legs foremost, a gatherer having an annular series of recesses conforming to the bottom of portions of the core slots of a slotted core, means for movably supporting the gatherer in such relation to the magazine that one leg of each hair pin is received by a recess in the annular row conforming to the location of the bottom portions of the slots of the core and the other leg is located on the gatherer at a point remote from the first mentioned leg at each operation of the magazine feed, means for indexing the gatherer to present succeeding recesses with relation to the magazine feed to receive a hair pin and for operating the magazine feed in timed relation whereby the gatherer receives a hair pin while stationary, means for causing the outer or remotely disposed legs of the hair pins to be moved into an annular row conforming to the location of the upper portions of the core slots, and for causing the annular series of hair pins to be moved longitudinally toward the magazine, and means for moving the magazine away from the gatherer.

10. A machine according to claim 9 in which the second mentioned means provides means for guiding the outer hair pin legs during movement thereof toward the inner hair pin legs.

11. A machine according to claim 9 having means operating automatically after predetermined number of operations of the gatherer indexer and magazine feed sufficient to fill the gatherer for causing the indexer and feed to stop, for causing the operation of the magazine moving means to move the magazine away from the gatherer and for causing the operation of the means for causing movement of the outer hair pin legs toward the other legs and for causing the hair pins to move longitudinally toward the magazine.

12. A machine for assembling hair pins in an annular series, spaced in a predetermined relation preparatory to assembly with a slotted core comprising a magazine having feed means for causing hair pins to discharge singly with their legs foremost, a gatherer having an annular series of recesses conforming to the bottom portions of the core slots of a slotted core, means for movably supporting the gatherer, in such relation to the magazine that one leg of each hair pin is received by a recess in the annular row conforming to the location of the bottom portions of the slots of the core and the other leg is located on the gatherer at a point remote from the first mentioned leg at each operation of the magazine feed, means for indexing the gatherer to present succeeding recesses with relation to the magazine feed to receive a hair pin and for operating the magazine feed in timed relation whereby the gatherer receives a hair pin while stationary, means for causing the outer or remotely disposed legs of the hair pins to be moved into an annular row conforming to the location of the upper portions of the core slots, and means operating automatically after a predetermined number of operations of the gatherer indexer and magazine feed sufficient to fill the gatherer for causing the indexer and feed to stop and to effect operation of the outer leg moving means.

13. A machine for assembling hair pins in an annular series, spaced in a predetermined relation preparatory to assembly with a slotted core, a magazine having feed means for causing hair pins to discharge singly with their legs foremost, a gatherer for receiving hair pins discharged singly from a magazine, comprising inner, intermediate and outer concentric members, the inner member providing leg receiving recesses in two annular rows conforming to the positions of the hair pin legs when assembled with the core, the outer member providing leg receiving recesses in an annular row remote from the inner member, means for guiding the outer legs from the recesses of the outer member to the outer row of recesses of the inner member, indexing mechanism connected with the outer member, longitudinal splines connecting the outer and intermediate members, means for preventing longitudinal movement of the inner member relative to the outer member and providing for relative rotation of the inner member, a helical spline connection between the intermediate and inner members, and means for moving the intermediate member longitudinally in order to rotate the inner member and to cause the outer legs to move into the recesses.

14. A machine according to claim 13 further characterized by the fact that the intermediate member is provided with grooves for guiding the outer legs during movement thereof.

15. A machine according to claim 13 and having a plate connecting the inner and outer members and in which the means which moves the intermediate member longitudinally is a fluid pressure means including a cylinder and a piston rod and rods passing through holes in said plate and connecting the piston rod with the intermediate member.

16. A machine for assembling hair pins in an annular series, spaced in a predetermined relation preparatory to assembly with a slotted core comprising a magazine having a feed for discharging hair pins singly with their legs foremost, a gatherer having an annular series of recesses conforming to the bottom portion of the core slots of a slotted core, means for movably supporting the gatherer in such relation to the magazine that one leg of each hairpin is received by a recess in the annular row conforming to the location of the bottom portions of the slots of the core and the other leg is located on the gatherer at a point remote from the first mentioned leg at each operation of the magazine feed, means provided by the gatherer for moving the outer legs of the hair pins into position conforming to the location of the outer portions of the core slots, a transfer head having a central opening for receiving the gatherer, means carried by the transfer head for securing the hair pins to the head in the predetermined order as effected by the gatherer in order that the hair pins may be transferred by the head and held by the head in longitudinal alignment with respect to the core slots of a core, means for moving the gatherer into and out of the transfer head, and means for indexing the gatherer to present succeeding recesses with relation to the magazine feed to receive a hair pin and for operating the magazine feed in timed relation whereby the gatherer receives a hair pin while stationary.

17. A machine according to claim 16 comprising also means for movably supporting the transfer head for movement into or out of alignment with the gatherer, and control means set into operation in response to movement of the transfer head into alignment with the gatherer for causing the gatherer moving means to move the gatherer into the transfer head.

18. A machine according to claim 16 comprising also means for movably supporting the transfer head for movement into or out of alignment with the gatherer, and control means set into operation in response to movement of the transfer head into alignment with the gatherer for causing the gatherer moving means to move the gatherer into the transfer head, and control means responsive to movement of the gatherer into the transfer head for initiating the operation of the gatherer-indexer and the magazine feed means.

19. A machine according to claim 16 comprising also a plate rotatably supported by the transfer head, devices carried by the plate for securing the hair pins to the head, and means for rotatably connecting the gatherer with the plate when the gatherer moves within the head.

20. A machine according to claim 16 comprising also a plate rotatably supported by the transfer head and provided with radial grooves, slide bars received by said grooves and having resilient fingers for engaging the hair pins when located for assembly with the core, a cam-follower provided by each bar, a cam plate having cam surfaces for respectively engaging the hair pins and retaining them in the order effected by the gatherer, said cam plate being rotatably supported by the head and rotatable with the slide-bar supporting plate, and means for rotatively connecting the gatherer with the slide-bar-supporting-plate when the gatherer moves within the head.

21. A machine according to claim 16 having also means provided by the gatherer for causing the hair pins to be moved toward the magazine concurrently with the locating of the hair pin outer legs in positions conforming to the location of the outer portions of the core slots, having means for moving the magazine feed toward and away from the gatherer, and having a control system provided with means for effecting the stopping of the means which operates the gatherer-indexer and the magazine-feed in response to a predetermined number of operations thereof sufficient to fill the gatherer with hair pins, and provided with means for effecting operation of the magazine moving means to move the magazine away from the gatherer and subsequently effecting the operation of the hair pin-locating-means of the gatherer to move the hair pin outer legs toward the inner legs and to move the hair pins toward the magazine.

22. A machine according to claim 16 having also means provided by the gatherer for causing the hair pin to be moved toward the magazine, said means being provided by the gatherer-means which causes movement of the hair pin outer legs into positions conforming to the location of the outer portions of the core slots.

23. A machine according to claim 16 having also a control system including means for controlling the operation of the gatherer-moving-means and provided with a manually operable member, means for locating the transfer head in alignment with the gatherer, means connecting the locating means with the manually operable member for retraction of the former by the latter from the transfer head when the latter is moved into position for causing the gatherer-moving-means to effect retraction of the gatherer from the transfer head, a latch movable (in response to movement of the transfer head away from the gatherer) into position for retaining the locating means in retracted position and the manually operable member in position for causing the gatherer-moving-means to move the gatherer away from the transfer head, said latch being movable (in response to movement of the transfer head into alignment with the gatherer) into position for permitting the return of the locating means and the manually operable member into normal position, and means for returning the locating means and manually operable member into normal positions upon their being released by the latch, thereby causing the gatherer-moving-means to move the gatherer into the transfer head.

24. A machine according to claim 16 having also a control system including a manually operable member and means operated thereby for effecting operation of the gatherer-moving-means, a movable bar connected with the manually operable member and received by a recess in the transfer head to locate the same in alignment with the gatherer, a spring biasing the bar into said recess and the manually operable member into position for causing the gatherer-moving-means to move the gatherer into the transfer head, manual operation of the manually movable member causing retraction of said bar and the retraction of the gatherer from the transfer head, a latch plate for holding the bar in retracted position when the transfer head is moved out of alignment with the gatherer, and a spring biasing the latch plate against the transfer head and whereby, when the transfer head is moved out of alignment with the gatherer, the plate is moved into position for holding the bar in retracted position and the manually operable member in position causing the gatherer to be retracted from the transfer head, the return of the transfer head into alignment with the gatherer causing the latch plate to be moved away from the bar and the bar to move into the recess of the transfer head and the manually operable member to move into normal position by the action of the first mentioned spring.

25. A machine according to claim 16 having also a control system including means for controlling the operation of the gatherer-moving-means and provided with a manually operable member, means for locating the transfer head in alignment with the gatherer, means connecting the locating means with the manually operable member for retraction of the former by the latter from the transfer head when the latter is moved into position for causing the gatherer-moving-means to effect retraction of the gatherer from the transfer head, a latch movable (in response to movement of the transfer head away from the gatherer) into position for retaining the locating means in retracted position and the manually operable member in position for causing the gatherer-moving-means to move the gatherer away from the transfer head, said latch being movable (in response to movement of the transfer head into alignment with the gatherer) into position for permitting the return of the locating means and the manually operable member into normal position, and means for returning the locating means and manually operable member into normal positions upon their being released by the latch, thereby causing the gatherer-moving-means to move the gatherer into the transfer head, and means responsive to movement of the gatherer into the transfer head for initiating the operation of the means for operating the magazine-feed and gatherer-indexer.

26. A machine according to claim 16 having also means provided by the gatherer for causing the hair pins to be moved toward the magazine concurrently with the locating of the hair-pin outer legs in positions conforming to the location of the outer portions of the core slots, having means for moving the magazine feed toward and away from the gatherer, and having a control system provided with means for effecting the stopping of the means which operates the gatherer-indexer and the magazine-feed in response to a predetermined number of operations thereof sufficient to fill the gatherer with hair pins, and provided with means for effecting operation of the magazine moving means to move the magazine away from the gatherer and subsequently effecting the operation of the hair pin-locating-means of the gatherer to move the hair pin outer legs toward the inner legs and to move the hair pins toward the magazine, said control system also including means for controlling the operation of the gatherer-moving-means and provided with a manually operable member, means for locating the transfer head in alignment with the gatherer, means connecting the locating means with the manually operable member for retraction of the former by the latter from the transfer head when the latter is moved into position for causing the gatherer-moving-means to effect retraction of the gatherer from the transfer head, a latch movable (in response to movement of the transfer head away from the gatherer) into position for retaining the locating means in retracted position and the manually operable member in position for causing the gatherer-moving-means to move the gatherer away from the transfer head, said latch being movable (in response to movement of the transfer head into alignment with the gatherer) into position for permitting the return of the locating means and the manually operable member into normal positions, and means for returning the locating means and manually operable member into normal positions upon their being released by the latch, thereby causing the gatherer-moving-means to move the gatherer into the transfer head.

27. A machine according to claim 16 having also means provided by the gatherer for causing the hair pins to be moved toward the magazine concurrently with the locating of the hair pin outer legs in positions conforming to the location of the outer portions of the core slots, having means for moving the magazine feed toward and away from the gatherer, and having a control system provided with means for effecting the stopping of the means which operates the gatherer-indexer and the magazine-feed in response to a predetermined number of operations thereof sufficient to fill the gatherer with hair pins, and provided with means for effecting operation of the magazine moving means to move the magazine away from the gatherer and subsequently effecting the operation of the hair pin-locating-means of the gatherer to move the hair pin outer legs toward the inner legs and to move the hair pins toward the magazine, said control system also including a manually operable member and means operated thereby for effecting operation of the gatherer-moving-means, a movable bar connected with the manually operable member and received by a recess in the transfer head to locate the same in alignment with the gatherer, a spring biasing the bar into said recess and the manually operable member into position for causing the gatherer-moving-means to move the gatherer into the transfer head, manual operation of the manually movable member causing retraction of said bar and the retraction of the gatherer from the transfer head, a latch plate for holding the bar in retracted position when the transfer head is moved out of alignment with the gatherer, and a spring biasing the latch plate against the transfer head and whereby, when the transfer head is moved out of alignment with the gatherer, the plate is moved into position for holding the bar in retracted position and the manually operable member in position causing the gatherer to be retracted from the transfer head, the return of the transfer head into alignment with the gatherer causing the latch plate to be moved away from the bar and the bar to move into the recess of the transfer head and the manually operable member to move into normal position by the action of the first mentioned spring.

28. A machine according to claim 16 having also means provided by the gatherer for causing the hair pins to be moved toward the magazine concurrently with the locating of the hair pin outer legs in positions conforming to the location of the outer portions of the core slots, having means for moving the magazine feed toward and away from the gatherer, and having a control system provided with means for effecting the stopping of the means which operates the gatherer-indexer and the magazine-feed in response to a predetermined number of operations thereof sufficient to fill the gatherer with hair pins, and provided with means for effecting operation of the magazine moving means to move the magazine away from the gatherer and subsequently effecting the operation of the hair pin-locating-means of the gatherer to move the hair pin outer legs toward the inner legs and to move the hair pins toward the magazine, said control system also including, means for controlling the operation of the gatherer-moving-means and provided with a manually operable member, means for locating the transfer head in alignment with the gatherer, means connecting the locating means with the manually operable member for retraction of the former by the latter from the transfer head when the latter is moved into position for causing the gatherer-moving-means to effect retraction of the gatherer from the transfer head, a latch movable (in response to movement of the transfer head away from the gatherer) into position for retaining the locating means in retracted position and the manually operable member in position for causing the gatherer-moving-means to move the gatherer away from the transfer head, said latch being movable (in response to movement of the transfer head into alignment with the gatherer) into position for permitting the return of the locating means and the manually operable member into normal position, and means for returning the locating means and manually operable member into normal positions upon their being released by the latch, thereby causing the gatherer-moving-means to move the gatherer into the transfer head, said control system also including means responsive to movement of the gatherer into the transfer head for initiating the operation of the magazine-moving-means to move the magazine toward the gatherer and for causing the hair pin locating means of the gatherer to be restored to normal status.

29. A machine according to claim 16 having also means provided by the gatherer for causing the hair pins to be moved toward the magazine concurrently with the locating of the hair pin outer legs in positions conforming to the location of the outer portions of the core slots, having means for moving the magazine feed toward and away from the gatherer, and having a control system provided with means for effecting the stopping of the means which operates the gatherer-indexer and the magazine-feed in response to a predetermined number of operations thereof sufficient to fill the gatherer with hair pins, and provided with means for effecting operation of the magazine moving means to move the magazine away from the gatherer and subsequently effecting the operation of the hair pin-locating-means of the gatherer to move the hair pin outer legs toward the inner legs and to move the hair pins toward the magazine, said control system also including means for controlling the operation of the gatherer-moving-means and provided with a manually operable member, means for locating the transfer head in alignment with the gatherer, means connecting the locating means with the manually operable member for retraction of the former by the latter from the transfer head when the latter is moved into position for causing the gatherer-moving-means to effect retraction of the gatherer from the transfer head, a latch movable (in response to movement of the transfer head away from the gatherer) into position for retaining the locating means in retracted position and the manually operable member in position for causing the gatherer-moving-means to move the gatherer away from the transfer head, said latch being movable (in response to movement of the transfer head into alignment with the gatherer) into position for permitting the return of the locating means and the manually operable member into normal positions, and means for returning the locating means and manually operable member into normal position upon their being released by the latch, thereby causing the gatherer-moving-means to move the gatherer into the transfer head, said control system also including means responsive to movement of the gatherer into the transfer head for initiating the operation of the magazine-moving-means to move the magazine toward the gatherer and for causing the hair pin locating means of the gatherer to be restored to normal status, said control system having also means responsive to movement of the magazine toward the gatherer for initiating the operation of the magazine-feed and the gatherer-indexer.

30. A machine according to claim 16 having also a control system provided with means operable in response to the completion of a predetermined number of operations of the magazine-feed and gatherer-indexer to cause the stopping of the means which operates the magazine-feed and gatherer-indexer and to effect the initiation of the operation of the gatherer-means for moving the hair pin outer legs toward the inner legs, means for controlling the operation of the gatherer-moving-means and provided with a manually operable member, means for locating the transfer head in alignment with the gatherer, means connecting the locating means with the manually operable member for retraction of the former by the latter from the transfer head when the latter is moved into position for causing the gatherer-moving-means to effect retraction of the gatherer from the transfer head, a latch movable (in response to movement of the transfer head away from the gatherer) into position for retaining the locating means in retracted position and the manually operable member in position for causing the gatherer-moving-means to move the gatherer away from the transfer head, said latch being movable (in response to movement of the transfer head into alignment with the gatherer) into position for permitting the return of the locating means and the manually operable member into normal position, and means for returning the locating means and manually operable member into normal positions upon their being released by the latch, thereby causing the gatherer-moving-means to move the gatherer into the transfer head, said control system having means responsive to movement of the gatherer into the transfer head for causing the hair pin locating means of the gatherer to be restored to normal status and for effecting the initiation of the operation of the means for operating the magazine-feed and the gatherer-indexer.

31. In a machine for assembling hair pins in an annular series for subsequent assembly with a slotted core, a gatherer having concentric inner, intermediate and outer members, said inner member having concentric annular rows of recesses conforming respectively to the inner and outer portions of the slots of a slotted armature core, the inner one of said rows initially receiving a leg of said hair pin to be assembled, said outer member having an annular row of recesses concentric with the rows of recesses, the inner recesses of the inner member and the recesses of the outer member initially receiving a leg of each hair pin to be assembled, said intermediate member having means for guiding hair pin legs from the recesses of the outer member into the recesses of the outer row of recesses of the inner member, means for longitudinally splining the intermediate member to the outer member, means for helically splining the intermediate member to the inner member, means for nonrotatively supporting the outer member and for rotatively supporting the inner member and for preventing relative longitudinal movement between said inner and outer members, and means for moving the intermediate member longitudinally relative to the inner and outer members in order to rotate the inner member relative to the outer members and thereby to cause hair pin legs in the recesses in the inner row of recesses of the inner member to be displaced rotatively with respect to the legs in the recesses of the outer member in order that said legs initially received by the outer member will move inwardly toward the inner member and be guided by the intermediate member into the outer row of recesses of the inner member.

32. A gatherer according to claim 31 having also means for moving the gatherer bodily in the direction of the axis of the gatherer.

33. A gatherer according to claim 31 further characterized in that the means for moving the intermediate member longitudinally includes a fluid pressure cylinder and a cooperating piston connected with the intermediate member, and having also a fluid pressure means for bodily moving the gatherer and the first mentioned fluid pressure means in the direction of the axis of the gatherer.

34. A gatherer according to claim 31 further characterized in that the means for moving the intermediate member longitudinally includes fluid pressure cylinder, a base supporting the cylinder, means spacing the base from the means for supporting the inner and outer members and connecting the base therewith for simultaneous movement axially of the members, a piston within said cylinder and connected with the intermediate member, and having also fluid pressure means comprising a cylinder and piston connected with said base in order bodily to move the gatherer members and the first mentioned cylinder and piston in the direction of the axis of the gatherer.

35. A machine for assembling hair pins in a predetermined order for subsequent assembly with a slotted core, comprising a magazine having feed means for discharging hair pins singly with their legs foremost, a gatherer having means normally in a position for receiving the discharged hair pins in an annular row with the hair pin yokes in un-nested relation and movable into a position for gathering the hair pins into yoke-nesting relation and locating their legs for simultaneous longitudinal entry into the core slots, means for operating the hair pin gathering means of the gatherer, a transfer head having means for engaging hair pins to retain them in the last defined relation, means for bodily moving the gatherer relative to the transfer head, means for indexing the gatherer and for operating the magazine feed in timed relation, a power shaft for operating the gatherer-indexer and magazine feed means and a control system for connecting the shaft with the indexer and feed and for maintaining said connection for a predetermined number of feeding and indexing operations sufficient to fill the gatherer and then providing for disconnecting said shaft and for effecting the operation of the hair pin gathering means to nest the hair pins, said system having means for controlling the gatherer moving means to move the same away from the transfer head so that the transfer head may be moved away from the gatherer and for causing the gatherer to be moved toward the transfer head after the latter has been restored to alignment with the gatherer, and said system having means responsive to movement of the gatherer toward the transfer head for returning the hair pin gathering means to normal status.

36. A machine according to claim 35 said control system having also means responsive to the movement of the gatherer toward the transfer head for connecting the shaft with the gatherer-indexer and magazine feed.

37. A machine according to claim 35 having also means provided by the gatherer for moving the hair pins toward the magazine concurrently with the operation of the hair pin gathering means, having also means for moving the magazine toward and away from the gatherer, and having means provided by the control system for causing the magazine-moving-means to move the magazine away from the gatherer prior to the operation of the gatherer to gather the hair pins and to move them toward the magazine.

38. A machine according to claim 35 having also means provided by the gatherer for moving the hair pins toward the magazine concurrently with the operation of the hair pin gathering means, having also means for moving the magazine toward and away from the gatherer, and having means provided by the control system for causing the magazine-moving-means to move the magazine away from the gatherer prior to the operation of the gatherer to gather the hair pins and to move them toward the magazine, and means provided by the control system and responsive to movement of the gatherer toward the transfer head to cause the magazine to move toward the gatherer.

39. A machine according to claim 35 having also means provided by the gatherer for moving the hair pins toward the magazine concurrently with the operation of the hair pin gathering means, having also means for moving the magazine toward and away from the gatherer, and having means provided by the control system for causing the magazine-moving-means to move the magazine away from the gatherer prior to the operation of the gatherer to gather the hairpins and to move them toward the magazine, and means provided by the control system and responsive to movement of the gatherer toward the transfer head to cause the magazine to move toward the gatherer and to cause the power shaft to be connected with the magazine-feed and gatherer-indexer.

40. A machine according to claim 35 having also means provided by the gatherer for moving the hair pins toward the magazine concurrently with the operation of the hair pin gathering means, having also means for moving the magazine toward and away from the gatherer, and having means provided by the control system for causing the magazine-moving-means to move the magazine away from the gatherer prior to the operation of the gatherer to gather the hair-pins and to move them toward the magazine, and means provided by the control system and responsive to movement of the gatherer toward the transfer head to cause the magazine to move toward the gatherer, and means responsive to movement of the magazine toward the gatherer for causing the power shaft to be connected with the magazine-feed and gatherer-indexer.

41. A machine for assembling hair pins in a predetermined order for subsequent assembly with a slotted core comprising a magazine having a feed for discharging hair pins singly with their legs foremost, a gatherer having means normally in a position for receiving the discharged hair pins in an annular row with the hair pin yokes in un-nested relation and movable into a position for gathering the hair pins into yoke-nesting relation and for locating their legs for simultaneous longitudinal entry into the core slots, means for operating the gathering means, a transfer head having provisions for engaging the hair pins to retain them in the last-defined relation, means for indexing the gatherer and for operating the magazine feed in timed relation, a power shaft, a clutch for connecting the power shaft with the last named means and having an axially movable driving member biased normally away from the driven member of the clutch, means for closing the clutch, means for maintaining the clutch closed for a predetermined number of operations of the indexing and feed means and comprising a clutch driven notched disc and a lever coordinated with the driving member of the clutch and provided with a lug for engaging the periphery of the disc, thereby holding the lever in a position for holding the clutch-driving member in engagement with the clutch driven member, said lug engaging the notch of the disc at the end of the cycle of operations of the indexing and feed means whereupon the clutch becomes disconnected, speed reducing gear connecting the driven member of the clutch with the disc, a rotary cam driven by said disc, a one-way driving connection between the disc and cam permitting movement of the cam independently of the disc, a self-restoring controller having a normal or first position for causing the gatherer operating means to move the gatherer into normal position, said controller having a second position for causing the gatherer operating means to move the gatherer into hair pin gathering position, said controller being operated by the cam from the first position to the second position when the disc notch aligns with the lever lug, and means for moving the cam relative to the disc and away from the controller thereby releasing the controller for self restoration to the normal or first position, whereupon the gatherer is restored to normal position.

42. A machine according to claim 41 having also means for moving the magazine away from the gatherer in response to movement of the controller into its second position and for moving the magazine toward the gatherer in response to movement of the controller into its first position.

43. A machine according to claim 41 having also means responsive to return of the controller to normal or first position for causing the clutch closing means to operate.

44. A machine according to claim 41 having also means for moving the magazine away from the gatherer in response to movement of the controller into its second position and for moving the magazine toward the gatherer in response to movement of the controller into its first position, and having also means responsive to movement of the magazine toward the gatherer for causing the clutch closing means to operate.

45. A machine according to claim 41 further characterized in that the clutch closing means is a solenoid, and having also means for moving the magazine away from the gatherer in response to movement of the controller into its second position and for moving the magazine toward the gatherer in response to movement of the controller into its first position, and having an electric switch closed during a portion of the movement of the magazine toward the controller and having a system of time-lag relays rendered operative by the closing of said switch for causing the solenoid to remain operative to hold the clutch driving member in engagement with the clutch driven member until the disc periphery contacts the lug of the clutch lever.

46. A machine according to claim 41 having also means for moving the gatherer toward and from the transfer head and further characterized in that the means for moving the cam relative to the disc and away from the controller, thereby releasing the controller for self-restoration to the normal position is a means which functions in response to movement of the gatherer toward the transfer head.

47. A machine for assembling hair pins in a predetermined order for subsequent assembly with a slotted core comprising a magazine having a feed for discharging the hair pins singly with their legs foremost, a gatherer having means normally in a position for receiving the discharged hair pins in an annular row with the hair pin yokes in unnested relation and movable into a position for gathering the hair pins into yoke-nesting relation and for locating their legs for simultaneous longitudinal entry into the core slots, means for operating the gathering means, means for indexing the gatherer and for operating the magazine feed in timed relation, a power shaft, a clutch having a driving member and a driven member for connecting the power shaft with the last named means, and having the driving member normally biased away from the driven member, means for closing the clutch, means for maintaining the clutch closed until a predetermined number of operations of the magazine-feed and the gatherer-indexer have been performed, a rotary member geared to the driven clutch member and making one revolution during the feeding and indexing cycle and operating to maintain the operation of the means for maintaining the clutch closed until the end of the cycle, a rotary cam driven by the rotary member, a one-way driving connection between the member and cam providing for moving the cam independently of the member, a self restoring controller having a normal or first position for causing the gatherer operating means to move the gatherer into normal position, said controller having a second position for causing the gatherer operating means to move the gatherer into hair pin gathering position, said controller being operated by the cam from the first position to the second position at the end of the feeding and indexing cycle, and means independent of the rotary member for moving the cam away from the controller, thereby releasing the controller for self restoration to normal position.

48. A machine for assembling hair pins in a predetermined order for subsequent assembly with a slotted core comprising a magazine having a feed for discharging the hair pins singly with their legs foremost, a gatherer having means normally in a position for receiving the discharged hair pins in an annular row with the hair pin yokes in unnested relation and movable into a position for gathering the hair pins into yoke-nesting relation and for locating their legs for simultaneous longitudinal entry into the core slots, means for operating the gathering means, means for indexing the gatherer and for operating the magazine feed in timed relation, means for effecting the stopping of the feed and indexer after a cycle of a predetermined number of operations and including a rotary member making one revolution during said cycle, a cam rotated by the rotary member, a one-way driving connection between the cam and rotary member permitting movement of the cam independently of the rotary member, a self restoring controller having a normal or first position for causing the gatherer operating means to move the gatherer into normal position, said controller having a second position for causing the gatherer operating means to move the gatherer into hair pin gathering position, said controller being operated by the cam from the first position to the second position at the end of the feeding and indexing cycle, and means for moving the cam relative to the rotary member and away from the controller, thereby releasing the controller for self restoration to normal position.

49. A machine for assembling hair pins in a predetermined order for subsequent assembly with a slotted core comprising a magazine having a feed for discharging the hair pins singly with their legs foremost, a gatherer having means normally in a position for receiving the discharged hair pins in an annular row with the hair pin yokes in unnested relation and movable into a position for gathering the hair pins into yoke-nesting relation and for locating their legs for simultaneous longitudinal entry into the core slots, means for operating the gathering means, means for indexing the gatherer and for operating the magazine feed in timed relation, a power shaft, a clutch having a driving member and a driven member for connecting the power shaft with the last named means, and having the driving member normally biased away from the driven member, means for closing the clutch means for maintaining the clutch closed until a predetermined number of operations of the magazine-feed and the gatherer-indexer have been performed, a rotary member geared to the driven clutch member and making one revolution during the feeding and indexing cycle and operating to maintain the operation of the means for maintaining the clutch closed until the end of the cycle, a rotary cam driven by the rotary member, a one-way driving connection between the member and cam permitting movement of the cam independently of the rotary member, a self restoring controller having a normal or first position for causing the gatherer operating means to move the gatherer into normal position, said controller having a second position for causing the gatherer operating means to move the gatherer into hair pin gathering position, said controller being operated by the cam from the first position to the second position at the end of the feeding and indexing cycle, and means for moving the cam relative to the rotary member and away from the controller, thereby releasing the controller for self restoration to normal position, and means rendered effective in response to the restoration of the controller to normal or first position for causing the clutch to be engaged.

50. A machine for assembling hair pins in a predetermined order for subsequent assembly with a slotted core comprising a magazine having a feed for discharging the hair pins singly with their legs foremost, a gatherer having means normally in a position for receiving the discharged hair pins in an annular row with the hair pin yokes in unnested relation and movable into a position for gathering the hair pins into yoke-nesting relation and for locating their legs for simultaneous longitudinal entry into the core slots, means for operating the gathering means, means for indexing the gatherer and for operating the magazine feed in timed relation means effecting the stopping of the feed and indexer after a cycle of a predetermined number of operations and including a rotary member making one revolution during said cycle, a cam rotated by the rotary member, a one-way driving connection between the cam and rotary member permitting movement of the cam independently of the rotary member, a self restoring controller having a normal or first position for causing the gatherer operating means to move the gatherer into normal position, said controller having a second position for causing the gatherer operating means to move the gatherer into hairpin gathering position, said controller being operated by the cam from the first position to the second position at the end of the feeding and indexing cycle and means for moving the cam relative to the rotary member and away from the controller thereby releasing the controller for self restoration to normal position, and means rendered effective in response to the restoration of the controller to normal or first position for causing the cycle of operation of the feed and indexer to start.

51. A machine for assembling hair pins in a predetermined order for subsequent assembly with a slotted core comprising a magazine having a feed for discharging hair pins singly, a gatherer having means for receiving the discharged hair pins in an annular row with their yokes in unnested relation and for moving the hairpins into yoke-nesting relation and for locating their legs for simultaneous longitudinal entry into the core slots, a transfer head having means for clamping the hair pins to the head in the last-mentioned location, a rotatable plate carried by the head for supporting said clamping means, means for locking the plate to the head, means for indexing the gatherer and for operating the magazine feed, means for moving the gatherer into the transfer head, splines connecting the gatherer with the plate, so that the plate rotates during the indexing of the gatherer, and means responsive to movement of the gatherer into the head for releasing the plate from locking engagement with the head.

52. A machine for assembling hair pins in a predetermined order for subsequent assembly with a slotted core comprising a magazine having a feed for discharging hair pins singly, a gatherer having means for receiving the discharged hair pins in an annular row with their yokes in unnested relation and for moving the hair pins into yoke-nesting relation and for locating their legs for simultaneous longitudinal entry into the core slots, a transfer head having means for clamping the hair pins to the head in the last-mentioned location, a rotatable plate carried by the head for supporting said clamping means, a spring urged bolt for locking the plate to the head, means for indexing the gatherer and for operating the magazine feed, means for moving the gatherer into the transfer head, splines connecting the gatherer with the plate so that the plate rotates during the indexing of the gatherer, and a cam on the gatherer which retracts the bolt as the gatherer moves into the transfer head.

53. A machine for assembling hair pins with a slotted armature core comprising aligned, relatively movable devices, one device supporting the core and the other device engaging the hair pin yokes, apparatus for effecting relative longitudinal movement between the devices, either approaching or retracting, a transfer head movable between the device and having means for retaining the hair pins in an annular row with their legs located for simultaneous longitudinal entry into the core slots, a self-restoring controller having a first or normal position causing the apparatus to effect approaching movement relatively between said devices and having a second position causing the apparatus to effect retracting movement relatively between said devices, manually operated means for causing the controller to move into the second position, means for latching the controller in the second position, said latching means being located in the path of movement of the transfer head into alignment with the devices and being retracted by said movement whereby the controller is permitted to return to first position, and means operated by the apparatus during the approaching movement between said devices for causing retraction of the hair pin retaining means of the transfer head.

54. A machine for assembling hair pins with a slotted armature core comprising aligned, relatively movable devices, one device supporting the core and the other device engaging the hair pin yokes, apparatus for effecting relative longitudinal movement between the devices, either approaching or retracting, a transfer head movable between the devices and having means for retaining the hair pins in an annular row with their legs located for simultaneous longitudinal entry into the core slots, a self restoring controller having a first or normal position causing the apparatus to effect approaching movement relatively between said devices and having a second position causing the apparatus to effect retracting movement relatively between said devices, manually operated means for causing the controller to move into the second position, a bar received by a recess of the transfer head when the transfer head is aligned with the devices and which is retracted by the manually operated means when actuated to move the controller into second position, a spring pressed latch plate biased against the transfer head and movable over the end of the bar when the head is moved out of alignment with the devices thereby retaining the manually operable means in position for holding the controller in the second position, said plate being moved by the transfer head out of engagement with the bar when the head is moved into alignment with the devices, a spring for restoring the manually operable means to normal position and the bar into position within the recess of the head, thereby permitting the controller to return to first position, and means operated by the apparatus during the approaching movement between said devices for causing retraction of the hair pin retaining means of the transfer head.

55. A machine for assembling hair pins with a slotted armature core comprising aligned, relatively movable devices, one device supporting the core and the other device engaging the hair pin yokes, apparatus for effecting relative longitudinal movement between the devices, either approaching or retracting, a transfer head movable between the devices and having means for retaining the hair pins in an annular row with their legs located for simultaneous longitudinal entry into the core slots, and a control system providing manually operable means for causing retracting movement relatively between said devices, and providing means responsive to movement of the transfer head into alignment with said devices for causing approaching movement relatively between said devices.

56. A machine for assembling hair pins with a slotted armature core comprising aligned, relatively movable devices, one device supporting the core and the other device engaging the hair pin yokes, apparatus for effecting relative longitudinal movement between the devices, either approaching or retracting, a transfer head movable between the devices and having means for retaining the hair pins in an annular row with their legs located for simultaneous longitudinal entry into the core slots, and a control system providing manually operable means for causing retracting movement relatively between said devices, and providing means responsive to movement of the transfer head into alignment with said devices for causing approaching movement relatively between said devices, and providing means for locking the transfer head in alignment with the devices in response to movement of the transfer head into alignment with said device, and means connecting the locking means with the manually operable means so that operation of the latter to effect retraction of the devices will also unlock the transfer head.

57. A machine for assembling hair pins with a slotted core, comprising aligned, relatively movable devices, one device for supporting the core and the other device for engaging the hair pin yokes, a transfer head movable between the devices and having means for retaining the hair pins in an annular row with their legs located for simultaneous longitudinal entry into the core slots, apparatus for effecting relative longitudinal movement between the devices, either approaching or retracting, means operated by the apparatus during approaching relative movement between said devices for causing retraction of the hair pin retaining means of the transfer head, and means for controlling the apparatus.

58. A machine for assembling hair pins with a slotted core comprising aligned, relatively movable devices, one device for supporting the core and the other device for engaging the hair pin yokes, a transfer head movable between the devices and having means for retaining the hair pins in an annular row with their legs located for simultaneous longitudinal entry into the core slots, mechanism for moving the core supporting device toward the hair pins to cause the core slots to receive the end portions of the hair pin legs, mechanism moving the yoke-engaging device toward the hair pin legs to cause the hair pins to be pushed through the core slots, means operating during movement of the hair pins by the second device for causing retraction of the hair pin retaining means of the transfer head, and means for controlling said mechanisms.

59. A machine for assembling hair pins with a slotted core comprising aligned, relatively movable devices, one device for supporting the core and the other device for engaging the hair pin yokes, a transfer head movable between the devices and having means for retaining the hair pins in an annular row with their legs located for simultaneous longitudinal entry into the core slots, mechanism for moving the core supporting device toward the hair pins to cause the core slots to receive the end portions of the hair pin legs, mechanism for moving the yoke-engaging device toward the hair pin legs to cause the hair pins to be pushed through the core slots, means operating during movement of the hair pins by the second device for causing retraction of the hair pin retaining means of the transfer head, and control means for causing the first mechanism to effect the movement of the core-supporting device in advance of the operation of the second mechanism to effect movement of the yoke-engaging device.

60. A machine for assembling hair pins with a slotted core comprising aligned, relatively movable devices, one device for supporting the core and the other device for engaging the hair pin yokes, a transfer head movable between the devices and having means for retaining the hair pins in an annular row with their legs located for simultaneous longitudinal entry into the core slots, mechanism for moving the core supporting device toward the hair pins to cause the core slots to receive the end portions of the hair pin legs, mechanism for moving the yoke-engaging device toward the hair pin legs to cause the hair pins to be pushed through the core slots, means actuated by the yoke-engaging device during its approach toward the hair pins for causing retraction of the hair pin retaining means of the transfer head, and control means for causing the first mechanism to effect the movement of the core-supporting device in advance of the operation of the second mechanism to effect movement of the yoke-engaging device.

61. A machine for a assembling hair pins with a slotted core comprising a transfer head having means for retaining the hair pins in an annular row with their legs located for simultaneous longitudinal entry into the core slots, means for supporting a slotted core in axial alignment with the annular row of hair pins supported by the transfer head, means for causing the end portions of the legs of the hair pins to be received by the core slots, means for retracting the hair pin retaining means of the transfer head, and means for causing the hair pin legs to move through the core slots.

62. A machine for assembling hair pins with a slotted core comprising a transfer head having means for retaining the hair pins in an annular row with their legs located for simultaneous longitudinal entry into the core slots, said retaining means comprising clamping members movable radially toward the hair pins, and a rotary camming plate for simultaneously operating the clamping members, means for rotating the plate in a direction for causing the clamping members to engage the hair pins, means for supporting a slotted core in axial alignment with the annular row of hair pins supported by the transfer head, means for causing the end portions of the legs of the hair pins to be received by the core slots, means for retracting the hair pin retaining means of the transfer head, said retracting means including a part which engages the rotary camming plate to rotate it in a direction to cause the clamping members to be withdrawn from the hair pins, and means for causing the hair pin legs to move through the core slots.

LORA E. POOLE.
ERNEST R. FAUSSET.